US011450214B1

(12) United States Patent
Trent et al.

(10) Patent No.: US 11,450,214 B1
(45) Date of Patent: Sep. 20, 2022

(54) FLIGHT PATH GENERATION BASED ON MODEL OF CONNECTIVITY

(71) Applicant: Architecture Technology Corporation, Eden Prairie, MN (US)

(72) Inventors: Barry A. Trent, Chanhassen, MN (US); Ranga S. Ramanujan, Medina, MN (US); Fabio F. Pozzo, Minneapolis, MN (US)

( * ) Notice: Subject to any disclaimer, the term of this patent is extended or adjusted under 35 U.S.C. 154(b) by 189 days.

(21) Appl. No.: 16/681,242

(22) Filed: Nov. 12, 2019

Related U.S. Application Data

(63) Continuation of application No. 15/622,142, filed on Jun. 14, 2017, now Pat. No. 10,482,773, which is a continuation of application No. 15/093,826, filed on Apr. 8, 2016, now Pat. No. 9,685,088.

(60) Provisional application No. 62/145,595, filed on Apr. 10, 2015.

(51) Int. Cl.
| | |
|---|---|
| *G08G 5/00* | (2006.01) |
| *G05D 1/10* | (2006.01) |
| *G01C 21/20* | (2006.01) |
| *G06Q 10/04* | (2012.01) |
| *G05D 1/00* | (2006.01) |

(52) U.S. Cl.
CPC ........... *G08G 5/0034* (2013.01); *G01C 21/20* (2013.01); *G05D 1/0022* (2013.01); *G05D 1/104* (2013.01); *G06Q 10/047* (2013.01); *G08G 5/0013* (2013.01); *G08G 5/0026* (2013.01); *G08G 5/0039* (2013.01); *G08G 5/0043* (2013.01); *G08G 5/0086* (2013.01)

(58) Field of Classification Search
CPC .. G08G 5/0034; G08G 5/0013; G08G 5/0026; G08G 5/0043; G08G 5/0086; G06Q 10/047; G05D 1/104; G05D 1/0022; G01C 21/20

See application file for complete search history.

(56) References Cited

U.S. PATENT DOCUMENTS

| | | |
|---|---|---|
| 6,370,452 B1 | 4/2002 | Pfister |
| 2010/0293123 A1 | 11/2010 | Barrett et al. |
| 2013/0218469 A1* | 8/2013 | Turton ............ G08G 1/096844 701/533 |
| 2014/0233099 A1 | 8/2014 | Stark et al. |

(Continued)

OTHER PUBLICATIONS

Air Force Programs, "Joint Mission Planning System—Air Force (JMPS-AF)", 2011, pp. 1-2, US.

(Continued)

*Primary Examiner* — Aaron L Troost
(74) *Attorney, Agent, or Firm* — Carlson, Caspers, Vandenburgh & Linquist P.A.

(57) ABSTRACT

A method of generating a flight path for an aircraft is provided. The method includes modeling geographic space and time that includes a plurality of mobile communication nodes. The model includes locations of each of the plurality of mobile communication nodes as those nodes move over time. The model also provides an indication of wireless connectivity between a radio on each of the plurality of communication nodes and a radio of the aircraft at their respective location. The method further includes running a plurality of flight paths through the model in order to identify a selected flight path that provides a desired level of connectivity between the aircraft and the plurality of communication nodes.

24 Claims, 18 Drawing Sheets

(56) References Cited

U.S. PATENT DOCUMENTS

| 2014/0267236 A1 | 9/2014 | Kontkanen |
| 2014/0280318 A1 | 9/2014 | Simms et al. |
| 2014/0365246 A1 | 12/2014 | Hayward et al. |
| 2015/0285654 A1 | 10/2015 | Kögler et al. |
| 2015/0341552 A1 | 11/2015 | Chen et al. |
| 2016/0196669 A1 | 7/2016 | Bak et al. |
| 2016/0239024 A1 | 8/2016 | Fletcher et al. |
| 2016/0328980 A1* | 11/2016 | Sharma .................. H04L 67/12 |

OTHER PUBLICATIONS

Air Force SBIR/STTR, "Innovation—Air Force SBIR/STTR Success Story", Nov. 2014, pp. 1-2, US.
Analytical Graphics, Inc., Systems Tool Kit (STK) STK10 [online], [retrieved on Aug. 30, 2016]. Retrieved from the internet: http://northropgrumman.com/Capabilities/bacn/Pages/default.aspx., pp. 1-4.
Northrup Grumman, "Battlefield Airborne Communications Node (BACN)" [online], [retrieved on Aug. 30, 2016]. Retrieved from the internet: http://www.agi.com/products/stk/stk-10/., pp. 1-2.
Plantenga, Todd D., Hopspack 2.0 User Manual, Scandia National Laboratories, Albuquerque, New Mexico and Livermore, California, Oct. 2009, Publication No. SAND2009-6265, pp. 1-65.
U.S. Patent and Trademark Office, "Notice of Allowance", U.S. Appl. No. 15/093,826, dated Feb. 24, 2017, pp. 1-10.
U.S. Patent and Trademark Office, "Office Action", U.S. Appl. No. 15/622,142, dated Mar. 27, 2019, pp. 1-15.

* cited by examiner

FLIGHT PATH GENERATION BASED ON MODEL OF CONNECTIVITY

RELATED APPLICATIONS

This application is a continuation of U.S. Pat. No. 10,482,773 filed on Jun. 14, 2017, entitled "VEHICLE PATH BASED ON COVERAGE OF NODES", which is a continuation of U.S. Pat. No. 9,685,088 filed on Apr. 8, 2016, entitled "COMMUNICATION TRAVEL PLAN GENERATION SYSTEM", which claims the benefit of United States Provisional Application No. US 62/145,595 filed on Apr. 10, 2015, entitled "DYNAMICS", each of which are hereby incorporated herein by reference.

GOVERNMENT CONTRACTS

This invention was made with government support under contract FA8750-14-C-0162 and FA8750-15-C-0156 awarded by the Air Force Research Laboratory (AFRL). The government may have certain rights in the invention.

BACKGROUND

Airborne communications systems have been developed to enable communications between communication devices in remote locations not having a communication infrastructure. For example, in a search and rescue situation an airborne communication hub can be used to provide a communication link between communication subscriber nodes, such as search rescue radios, that are spread out over great distances and varying terrain. Another example is the use of an airborne communication hub in a battlefield environment where a communication link is needed between communication subscriber nodes that can also be located at great distances between each other and in varying terrain.

In implementing airborne communication systems, a flight path/orbit is manually generated for a flight path planning system of an aerial vehicle that houses the airborne communication hub. The flight plan includes waypoints for the aerial vehicle to pass through to position the communication hub in desired locations to enable communication links between the communication hub and communication subscriber nodes.

In creating a flight path/orbit for the aerial vehicle, a mission planner combines his experience with information that includes the location of communication subscriber nodes, knowledge of the aerial platform and the type of terrain. This approach, however, is fraught with difficulty. As the number of communication subscriber nodes, their respective mission priorities and communication requirements increase, the planner is presented with a combinatorial explosion of interacting variables that need to be considered in creating the flight path/orbit. Indeed, this problem is akin to one of the classic problems of computer science, the "traveling salesman" problem in which a path of travel between multiple cities which minimizes distance traveled is the goal. In general, only approximate solutions for this problem can be found, and then only by using sophisticated non-deterministic algorithms. Moreover, if we begin to consider other variables such as radio capabilities, weather effects, and other complicating factors it becomes clear the kind of multi-disciplinary expertise required of the mission planner is unobtainable. Furthermore, when the mission planner does enter a set of waypoints it is hard to measure or predict the effectiveness of the path/orbit and precisely when subscribers can actually expect to have connectivity.

BRIEF DESCRIPTION

Embodiments described herein provide for a method of generating a flight path for an aircraft. The method includes modeling geographic space and time that includes a plurality of mobile communication nodes. The model includes locations of each of the plurality of mobile communication nodes as those nodes move over time. The model also provides an indication of wireless connectivity between a radio on each of the plurality of communication nodes and a radio of the aircraft at their respective location. The method further includes running a plurality of flight paths through the model in order to identify a selected flight path that provides a desired level of connectivity between the aircraft and the plurality of communication nodes.

Embodiments also provide for a non-transitory processor readable medium comprising instructions stored thereon. The instructions, when executed by one or more processing devices, cause the one or more processing devices to model geographic space and time including a plurality of mobile communication nodes. The model includes locations of each of the plurality of mobile communication nodes as those nodes move over time. The model also provides an indication of wireless connectivity between a radio on each of the plurality of communication nodes and a radio of the aircraft at their respective locations. The instructions are further configured to run a plurality of flight paths through the model in order to identify a selected flight path that provides a desired level of connectivity between the aircraft and the plurality of communication nodes.

Embodiments also provide for an aircraft comprising a means of propulsion, one or more processing devices configured to control the means of propulsion, and a data storage medium coupled to the one or more processing devices. The data storage medium has instructions stored thereon which, when executed by the one or more processing devices, cause the one or more processing devices to control the means of propulsion to propel the vehicle along a flight path generated based on a model of geographic space and time. The instructions also obtain information regarding the environment around the aircraft via sensors on the aircraft as the aircraft travels along the selected flight path. The instructions also compare the information from the sensors to values used for the model of geographic space and time. If any of the information from the sensors is outside of a threshold range of the values used for the model the geographic space and time, the instructions dynamically update the flight path of the aircraft by re-modeling the geographic space and time based on the information output from the sensors. The instructions also run a plurality of flight paths through the re-model to identify an updated flight path that provides a desired level of connectivity between the aircraft and the plurality of communication nodes.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1A:
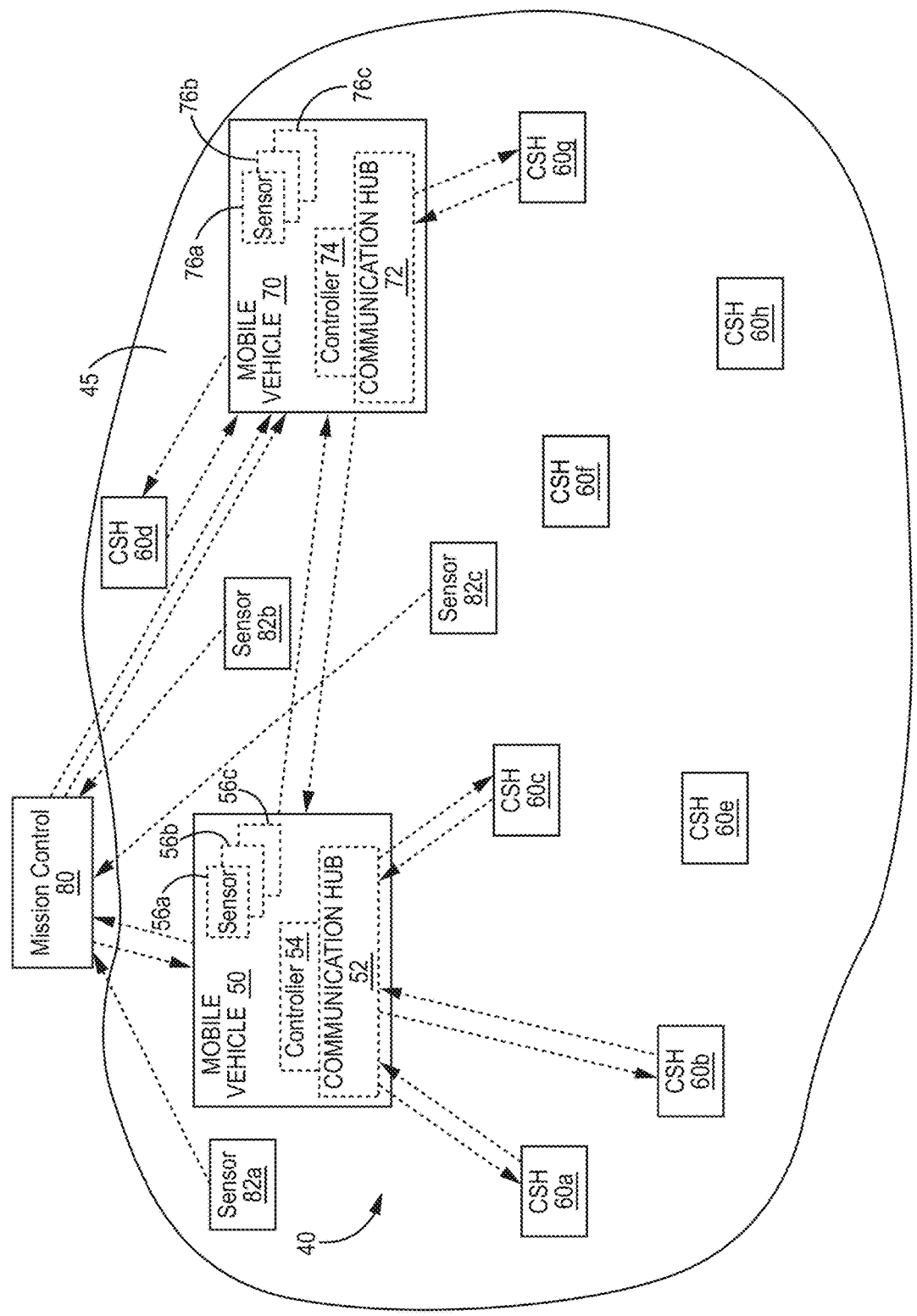
FIG. 1A illustrates an example communication system that implements a communication travel plan generation system.

FIG. 1A illustrates a communication system 40 that implements embodiments of a communication travel plan generation system. In this example embodiment, a mobile vehicle 50 traverses about travel area 45. Throughout area 45 are located a plurality of spaced communication subscriber hubs 60a-60h. The communication subscriber hubs 60a-60h communicate with the communication hub 52 of the mobile vehicle 50 as the mobile vehicle traverses throughout the travel area 45 during a mission. The communication travel plan generation system of embodiments automatically generates travel waypoints for the mobile vehicle 50 with at least one controller 54. The generation of the travel waypoints is based on the location of the communication subscriber hubs 60a-60g and mission-specific information as described in detail below. In an embodiment, more than one mobile vehicle with a communication hub is used in the communication system 40. As illustrated, the communication system 40 is shown as also including mobile vehicle 70. Mobile vehicle 70 in this example embodiment also includes a communication hub 72, a controller 74 and sensors 76a, 76b and 76c. The communication travel plan generation system of an embodiment is configured to coordinate the paths of both mobile vehicles 50 and 70 in this situation. Moreover, more than two vehicles could be implemented in a similar manner in a communication system.

FIG. 1A also illustrates an embodiment with a mission control 80 that is in communication with the mobile vehicles 50 and 70. Mission control 80 in an embodiment, provide mission-specific information to the respective mobile vehicles 50 and 70. Mission control 80 is further in communication with sensors 82a, 82b and 82c. Sensors 82a, 82b and 82c provide mission-specific information in an embodiment to the mission control 80 related to surveillance information. Mission control 80 communicates sensed mission-specific information to the mobile vehicles 50 and 70. The sensor generated mission-specific information is used in an embodiment to dynamically change the travel path of one or more of the mobile vehicles 50 or 70 as further discussed in detail below. The sensors 82a, 82b and 82c may include, but are not limited to, radar sensors, camera sensors, thermal imaging sensors, etc. In one embodiment, sensors 56a, 56b, 56c, 76a, 76b and 76c are implemented within the mobile vehicles 50 and 70 themselves. This embodiment provides a system that allows the mobile vehicle 50 and 70 to dynamically update the travel path autonomously.

Although, the communication travel plan generation system can be applied to any type of communication system that implements a mobile vehicle with a communication hub it has particular applicability to aerial vehicles. One aerial vehicle application is for military use where an aerial platform with a communication hub is needed to provide communication links to subscriber communication nodes on land, air, and sea. The mission-specific information for this type of application may include the types of subscriber communication nodes to be used, the capabilities of the aerial platform itself, and a host of other potential data such as terrain, weather, relative priority of the various subscriber nodes and surveillance information. As discussed, mission-specific information needed in the communication system 40 includes the type of and capabilities of the communication subscriber nodes 60a-60h that need to communicate with the communication hub 52 of the mobile vehicle 50. Regarding military applications, despite efforts to standardize, a wide variety of military radios exist with varying capabilities and functions. Some older radios may only provide voice communications, or support legacy data communication approaches, such as Link-16. Newer radio systems typically support IP-based network communications, and may even use IP protocols to support other important functions, such as Voice over IP, file transfers, email, etc. It is desirable for an automated planning system to be able to accommodate this wide variety of radios and capabilities. Even for a particular instance of radio hardware it is quite possible that different radio waveforms with different capabilities and functions are supported. For example, Harris's PRC-152A and PRC-117G radios are capable of operating using either the ANW2 or the SRW waveform, and can even switch back and forth between these two modes of operation with the simple flip of a switch. In addition, an aerial platform typically incorporates a mix of different radio types, potentially including both legacy and IP-based radios. The capabilities of an aerial platform therefore are, at a minimum, the sum of the collection of the radios it includes. Finally, different radios and platforms may be available in different configurations. For example, different antenna configurations or the presence of external power amplifiers can radically alter the performance characteristics of radios.

Mission-specific radio planning parameters are also an issue where, for instance, a total bandwidth of 1Mbps might be evenly divided amongst the expected number of radio elements. A 2-radio network might be set for 500 Kbps per radio, whereas a 10-radio configuration might be set for 100 Kbps per radio. An automated planning system preferably is capable of accepting a wide variety of input data about a diverse set of radios, platforms, and their configurations. Moreover, a truly advanced planning system of an embodiment incorporates planning elements which actually define the configuration of the radios themselves and even suggest, for example, desired antenna or power amplifier configurations.

Figure 1B:
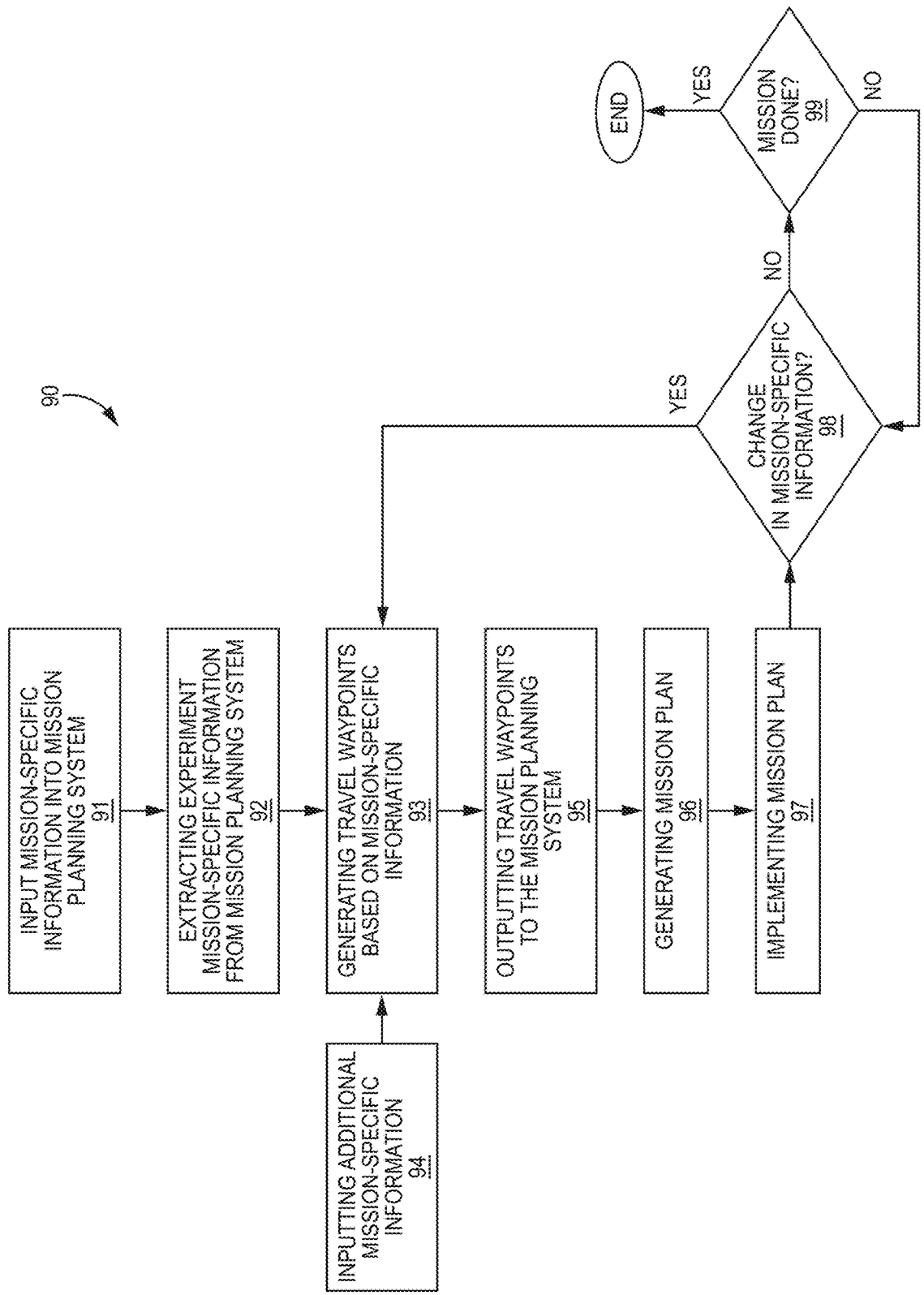
FIG. 1B is an example travel generation flow diagram.

FIG. 1B illustrates a travel generation flow diagram 90 of one embodiment. The travel generation flow diagram 90 sets out steps in implementing and applying a mission plan for a mobile vehicle, such as mobile vehicle 50 discussed above. The process starts by inputting mission-specific information into a mission planning system of the vehicle at step (91). The mission-specific information would include the location of the communication subscriber nodes 60a-60g. Other mission-specific information is described in detail below. Pertinent mission-specific information is then extracted from the mission planning system at step (92). The pertinent mission-specific information is used to generate travel waypoints at step (93). This is done in embodiments with the communication travel plan generation system generally described above and further described in detail below. In one embodiment, all of the mission-specific information needed to generate the travel waypoints are extracted from the mission planning system. In another embodiment, the communication travel plan generation system receives at least some of the mission-specific information from another source, such as, but not limited to, mission control 80, an input to the communication travel plan generation system used during pre-planning, and sensors 65a, 56b and 56c at step (94). As described in detail below, the communication travel plan generation system implements a geographical simulation in generating the travel waypoints. Further as described below, an embodiment of the communication travel plan generation system using an optimization function to optimize the travel waypoints.

Once the travel waypoints have been generated, they are output to the mission planning system of the vehicle 50 at step (95). The mission planning system then uses the waypoints to generate a mission plan at step (96). In this example embodiment, the mission plan is to implement at step (97). The vehicle 50 then traverses the travel area 45 and communicates with communication subscriber nodes 60a-60b. In this embodiment, the controller 54 of the vehicle 50 monitors for changes in the mission-specific information (98). If no changes to the mission-specific information is detected at step (98), it is then determined if the mission is complete at step (99). If the mission is complete at step (99), the process ends. If the mission is not complete at step (99), the controller 54 continues to monitor for changes in the mission-specific information at step (98). If the controller does detect changes in the information-specific information at (98), a new set of path waypoints are generated at step (93) and the process continues as shown. Hence, this embodiment illustrates a system that dynamically changes the mission plan as the mission-specific information changes.

The operation of mobile airborne and air/surface networks and radios is a highly dynamic proposition. Hence, having the ability to dynamically adjust the mission plan during a mission based on changing situations is highly desirable in some situations. While traditional "forward" flight planning can be used to direct an airborne communications platform to its intended mission area and back to its base, the flight behavior it exhibits while actually "loitering" over a battle space or following communication subscribers have a major impact on critical parameters such as network bandwidth, coverage footprint, and radio range. For many Internet Protocol (IP) and data-oriented radio networks bandwidth, for example, may vary widely depending on distance and other factors. Entry and exit of elements into and out of the battlespace are also key factors that may not always be easily predictable. To the extent that the motion of supported elements and entry/exit times are known ahead of time pre-planning may be done, but the real strength of an advanced system of embodiments is to allow for dynamic re-planning in the face of changing conditions during the actual mission. Other dynamic mission-specific information may include terrain, weather effects, antenna orientation during flight maneuvers, surveillance information and constraints based on known or suspected positions of enemy elements are also capable of changing rapidly and effecting mission performance.

Finally, as deployment of airborne communication platforms grows, it is expected that multiple airborne platforms, as discussed above in regards to FIG. 1, are used in support of a single mission. The ability to plan and control these multiple platforms in a coordinated way may be important. For example, multiple platforms might form a mesh network amongst themselves while still supporting communication subscribers, permitting a pre-planned (or dynamically managed) hand-off of support from one platform to another and advanced routing between airborne platforms. This type of advanced capability could be used to support connectivity both within the battle space and to other elements located remotely or otherwise outside of the battle space proper. The ability to balance the communication and connectivity requirements of diverse elements in a mission and to ensure that all requirements are met as well as possible in the face of dynamically changing network and battle space conditions is a key challenge for any advanced mission planning system.

In an embodiment, a mission planner simply enters the location of the communication subscriber nodes, along with the mission-specific information described above such as mission priorities and the types of subscriber communication nodes in use into an existing mission planning system. The communication travel plan generation system pulls this information from the mission planning system and uses the platform, terrain, radio, and other information available to it to automatically generate a set of travel waypoints which are inserted back into the mission planning system. With this system, mission planning personnel are no longer required to have multi-disciplinary expertise and a wealth of experience to plan the flight path. The communication travel plan generation system performs the complex tasks and shields mission planning personnel from all the inherent complexity of the problem. An important benefit of this approach is that it can more effectively utilize the resources of the dedicated aerial platform, maximizing radio connectivity for subscribers as required for the mission. Moreover, in an embodiment, the communication travel plan generation system not only analyzes the given mission information and generates the flight path, it also predicts when and how much coverage can be expected by each communication subscriber node. This can be critically important for communication subscriber nodes, allowing them to budget and extend the battery life of radios and also know when to expect connectivity during the course of their missions. As discussed above, in one embodiment, the communication travel plan generation system is configured to dynamically adjust the flight path based on changes in the mission information. This dynamic communication travel plan generation system can be referred to a Dynamic Airborne Mission Communication System (DYNAMICS).

Figure 2:
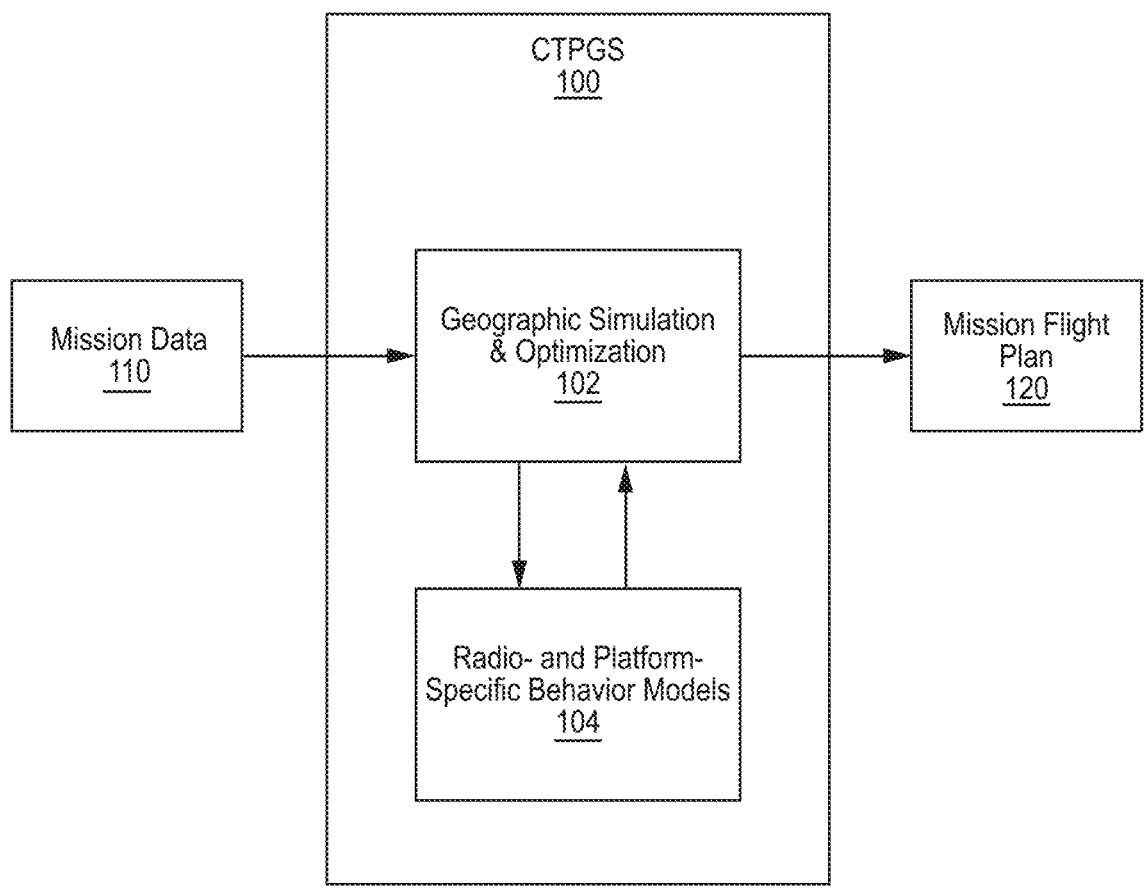
FIG. 2 is a block diagram of an example communication travel plan generation system that implements the travel generation flow diagram of FIG. 1B.

A simplified diagram of a basic communication travel plan generation system 100 of an embodiment is illustrated in FIG. 2. As illustrated, mission-specific information 110 is input into the communication travel plan generation system 100. Mission-specific information, as discussed above, may include information related to airborne, maritime or ground-based radios in use in the communication subscriber nodes, the communication subscriber nodes configurations, the communication subscriber nodes locations on or near the earth, the communication subscriber nodes communication requirements and priorities as well as surveillance information, terrain information and weather information. The communication travel plan generation system performs a geographic search/simulation/optimization process 102, described in detail below, on the volume of space containing the communication subscriber nodes to find the best locations/paths for airborne platform(s) to support the communication subscriber nodes and meet their communication requirements. In embodiments, the geographical search/simulation/optimization process 102 uses values derived from radio-specific and platform-specific behavior models 104 to determine the suitability for placement of airborne platforms. An output 120 of communication travel plan generation system 100 is a mission flight plan (that includes the travel waypoints) for an avionic vehicle. The mission flight plan 120 would be used by a mission planning system of the avionic vehicle to generate a flight path of the avionic vehicle.

Figure 3:
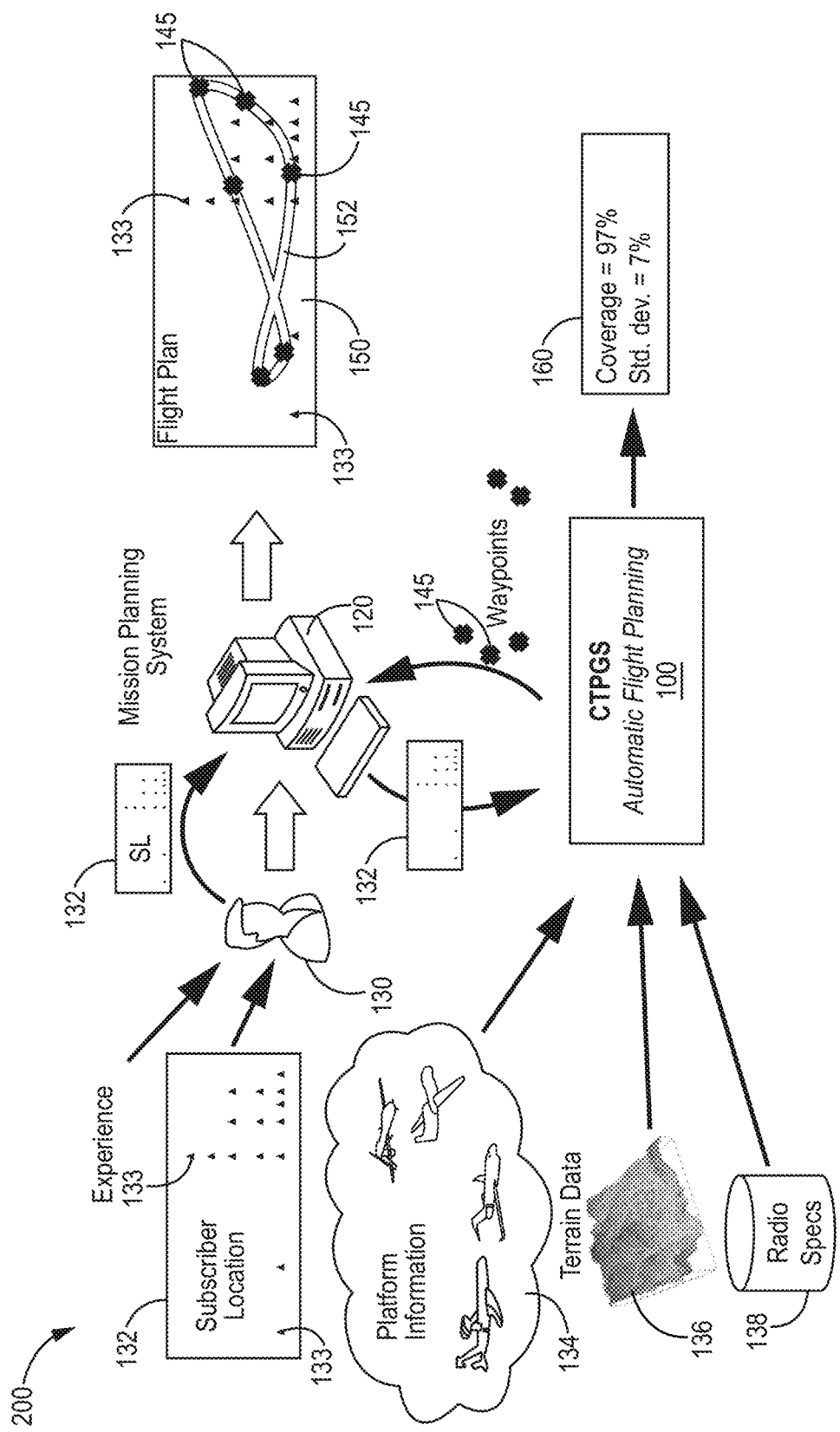
FIG. 3 is an illustration of an example flight planning and communication system.

A generalized overall illustration of a flight planning and communication system 200 of an embodiment is illustrated in FIG. 3. The mission planner 130 in this embodiment simply enters into the mission planning system 120 the location of each communication subscriber node 133 that is to be communicated with during a mission. The locations of each communication subscriber node 133 are shown, for illustration purposes in FIG. 3, as a subscriber location map 132. In this embodiment, the mission planning system 120 passes the communication subscriber location map 132 to the communication travel plan generation system 100 for processing. The communication travel plan generation system takes this information, along with other mission-specific information that may include platform information 134, terrain information 136, radio specification information of the communication subscriber nodes 138, mission priorities information and other available information to automatically generate a set of travel waypoints 145 which is communicated back into the mission planning system 120. The mission planning system 120 then, based on the relieved waypoints from the communication travel plan generation system 100 sets out the flight path 150. As discussed above, although the platform information 134 is illustrated as including avionic vehicles, embodiments can be employed on other types of mobile vehicles that include a communication hub that is to be in communication with a plurality of communication subscriber nodes. Hence, the mission planning system 120 may provide a travel path instead of a flight path. Further, in embodiments, communication travel plan generation system 100 analyzes the scenario and the flight path to predict when and how much coverage 160 can be expected by each communication subscriber node as described below.

Use of the communication travel plan generation system 100 addresses three major technical challenges to achieve the capability for inverse planning of mission flight plans. First the planning solution is capable of dealing with a diverse set of military radios of the communication subscriber nodes. Some of these radios support sophisticated IP networking, while others may support only voice or older, legacy networking capabilities. Second, in embodiments, the planning software is integrated with existing and future mission-planning systems, as well as being able to operate in a stand-alone manner both for testing and as a viable use case. Thirdly, in addition to being able to "pre-plan" missions, the planning solution in an embodiment react in real time during the course of a pre-planned mission to adjust flight geometry and dynamically re-plan based on changes in the battle space.

Figure 4A:
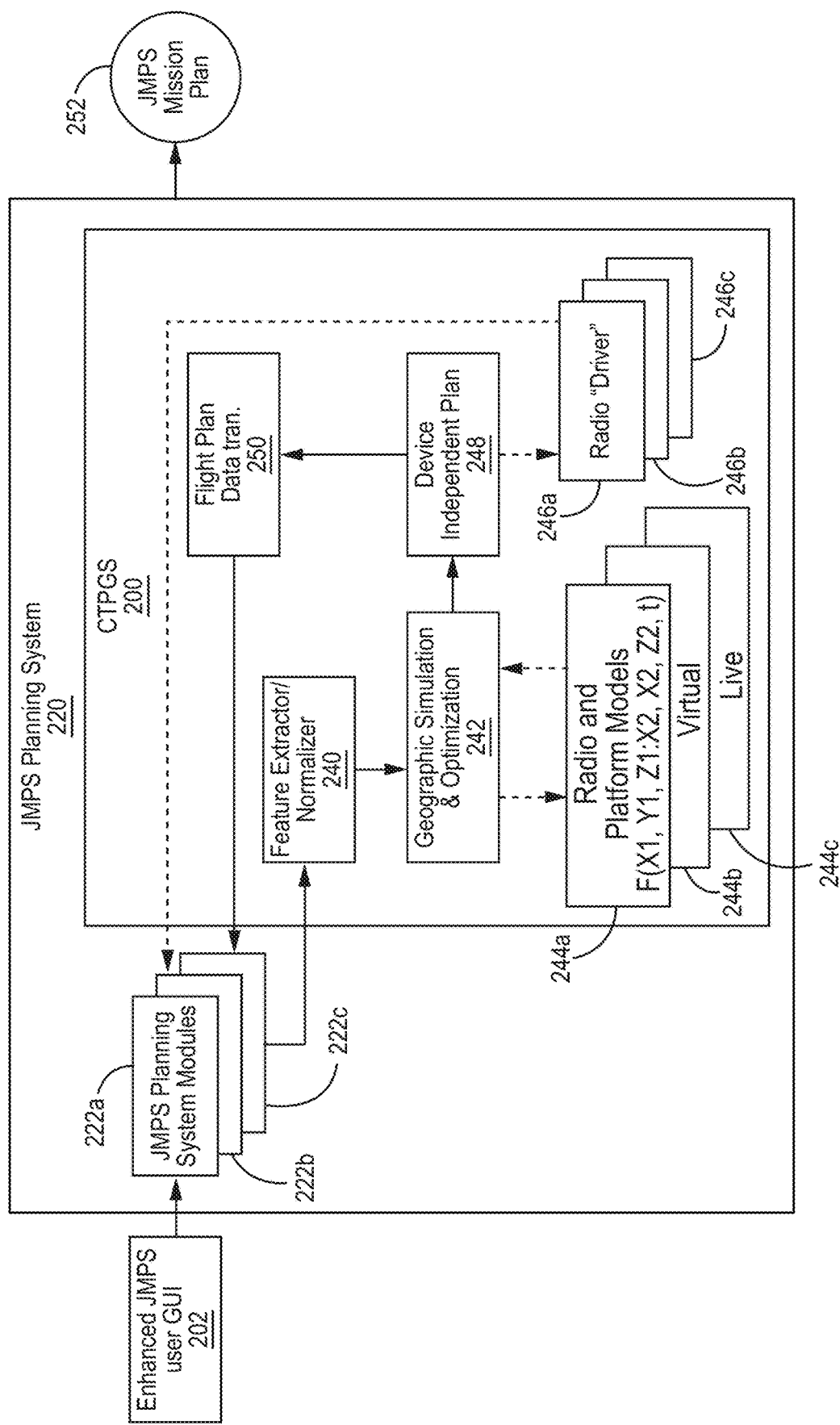
FIG. 4A is a block diagram of an example Joint Mission Planning System implementing the communication travel plan generation system of FIG. 2.

As discussed above, the communication travel plan generation system 200 can be a standalone package or can be integrated in a mission planning system. By designing in complete input/output isolation, the innovative communication travel plan generation system approach ensures easy integration with present and future planning systems as well as stand-alone operation. An example of a communication travel plan generation system 200 integrated with a mission planning system 220, such as the Joint Mission Planning System (JMPS), is illustrated in FIG. 4A. As illustrated, the mission planner provides mission specific data as discussed above to the mission planning system 220 through a JMPS Graphic User Interface (GUI) 202. The JMPS GUI 202 allows additional information needed by the communication travel plan generation system 200 to be entered as further discussed below. The JMPS GUI 202 allows users to enter all of the required inputs, as described above, into the system using its native formats and units. This JMPS GUI 202 includes data items not already present in the parent planning system 220. In order to provide maximum flexibility in interacting and integrating with existing systems, the inputs and output of the core communication travel plan generation system function are insulated by device/platform independent input and output planning system modules 222a, 222b and 222c.

In the embodiment of FIG. 4A, a feature extractor/normalizer 240 of the communication travel plan generation system 200 is configured to receive communications from JMPS system module 222c. The feature extractor/normalizer 240 serves as an input function to a geographic simulation and optimization system 242 of the communication travel plan generation system 200. The feature extractor/normalize 240 interacts with JMPS modules 222c of the overall JMPS planning system 220 to extract the features needed by the communication travel plan generation system 200. The extractor/normalizer 240 performs any data format conversions necessary for the geographic simulation and optimization system 242 of the communication travel plan generation system 200. Mission information to be extracted from the mission planning system 220 into the geographic simulation and optimization system 242 of the communication travel plan generation system 200 includes, for example, mission elements, communications/connectivity requirements, air borne platform capabilities and constraints. The mission elements may include the radio capabilities and configurations, the position over time and relative priorities. The communications/connectivity requirement information may include bandwidth, latency, loss and maximum allowed down-time. The air borne platform capability information may include radio and configurations, physical flight characteristics, normal/maximum velocity, turning radius, flight longevity and elevation capacities. Finally, the constraints requirement information may include terrain maps and enemy positions.

The geographic simulation and optimization system 242 of the communication travel plan generation system 200 uses radio and platform models, as discussed below, in generating a device independent plan 248. Output translation modules translate this device independent plan 248 back into the format(s) required by the parent planning system 220. At a minimum, this would include the flight plan data translator 250 shown in FIG. 4A. The flight plan data translator 250 communicates the essential elements of the communication travel plan generation system's 200 generated plan back into the parent planning system 220 using the formats and units the parent planning system expects. In particular, the flight path data translator 250 communicates the flight path data and waypoints to JMPS system module 222c. In response to this information, the parent planning system 220 outputs a JMPS mission plan 252. In an advanced embodiment of the communication travel plan generation system 200, specific programming and configuration instructions for individual radios in the mission, both in the air and on the surface, are included. These translation modules are shown as Radio "Drivers" 246a, 246b and 246c in FIG. 4A. Each individual type of radio would have its own driver module 246a, 246b and 246c that is configured to receive communications from the device independent plan and output communications to the JMPS system module 222b.

The communication travel plan generation system 200 is able to plan missions for a wide (and growing) variety of military radios and aerial platforms, such as but not limited to, unmanned aerial vehicles platforms. In order to incorporate the behavior and characteristics of all of these elements into the system, the geographic simulation and optimization system 242, the communication travel plan generation system 200 uses a series of "wrapper" functions around models 244a, 244b and 244c of radio and airplane behavior. The basic idea is that, for a particular pair of radios of a certain type, there is a function $F(x1,y1,z1,x2,y2,z2,t)$ which provides connectivity information about the two radios at locations $(x1,y1,z1)$ and $(x2,y2,z2)$ at a time t. For an IP or legacy digital radio, these characteristics would take the form of bandwidth, latency, and loss. For a legacy or analog radio the characteristics would be signal strength, gain, and/or S/N ration. So, given any two radios in the mission at a particular time communication travel plan generation system 200 can predict the quality of the link between the two radios. Similarly, for a particular aerial platform, communication travel plan generation system has a model of the vehicle's flight parameters, including such items as minimum and maximum speed, elevation, turn angles, and flight longevity. This approach has two main benefits. First, in order to add a new radio to communication travel plan generation system you just create a new version of this function for the new radio type and platform. Secondly, the wrapper modeling function can be either a constructive model 244a (i.e. purely mathematical), a virtual model 244b (simulated or emulated) or live model 244c (measurement between two actual radios). This allows for great flexibility since the communication travel plan generation system 200 in an embodiment can be used in a pure pre-planning system or in another embodiment in a dynamic, run-time re-planning system.

Figure 4B:
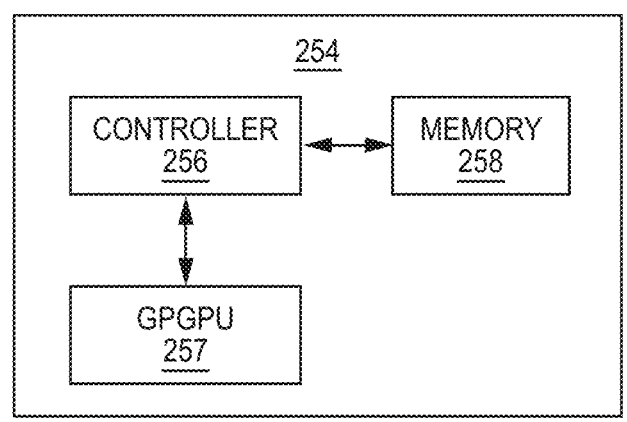
FIG. 4B is a block diagram of an example processing system for the communication travel plan generation system of FIG. 2.

In order to assess the suitability of particular flight paths and waypoints for a mobile relay platform to the requirements of a particular mission, the communication travel plan generation system 200 systematically determines the characteristics of the airborne and surface-based radios at any point in time throughout the entire battle space volume. In order to perform this function, a controller 256 in a processing system 254, illustrated in FIG. 4B, implements the geographical simulation and optimization system 242 of the communication travel plan generation system 200. The geographical simulation and optimization system 242 includes an innovative 3D/4D simulation and optimization algorithm. The algorithm is suitable for an adjunct high-performance processing unit 257 with accelerated execution using parallel processing techniques. Examples of a high-performance processing units includes, but are not limited to, Commercial Off the Shelf (COTS) General Purpose Graphics Processing Unit (GPGPU) hardware, parallel processors and clustered computers. FIG. 4B also illustrates the processing system includes a memory 258 to store communication travel plan generation system instructions and results.

In general, the controller 256 (processor) may include any one or more of a microprocessor, a digital signal processor (DSP), an application specific integrated circuit (ASIC), a field program gate array (FPGA), or equivalent discrete or integrated logic circuitry. In some example embodiments, controller 256 may include multiple components, such as any combination of one or more microprocessors, one or more controllers, one or more DSPs, one or more ASICs, one or more FPGAs, as well as other discrete or integrated logic circuitry. The functions attributed to controller 256 herein may be embodied as software, firmware, hardware or any combination thereof. Memory 258 may include computer-readable instructions that, when executed by controller 256 provide functions of the processing system 254. Such functions include the functions of the communication travel plan generation system 200. The computer readable instructions may be encoded within the memory 258. Memory 258 may comprise computer readable storage media including any volatile, nonvolatile, magnetic, optical, or electrical media, such as, but not limited to, a random-access memory (RAM), read-only memory (ROM), non-volatile RAM (NVRAM), electrically-erasable programmable ROM (EEPROM), flash memory, or any other storage media.

In order to determine the suitability of a particular candidate flight path, the geographical simulation and optimization system 242 of the communication travel plan generation system 200 defines the concept of "coverage" (which is also sometimes referred to as "duty-cycle"). In its simplest form, coverage is expressed as a percentage. It is the percentage of the flight time for a given flight path that each communication subscriber has connectivity with the radio on the aerial platform. So, for each subscriber, a given flight path of the aerial platform and the radio(s) it supports yields a coverage value between 100% (always covered/connected) and 0% (never covered/connected). Various factors influence coverage, including radio parameters, the position and orientation of the aerial platform in space, and other physical factors such as ground terrain, weather, and the curvature of the earth. The more of these factors that are considered in computing coverage the higher the fidelity of the coverage model and, of course, the higher the computational cost to determine coverage.

Figure 5:
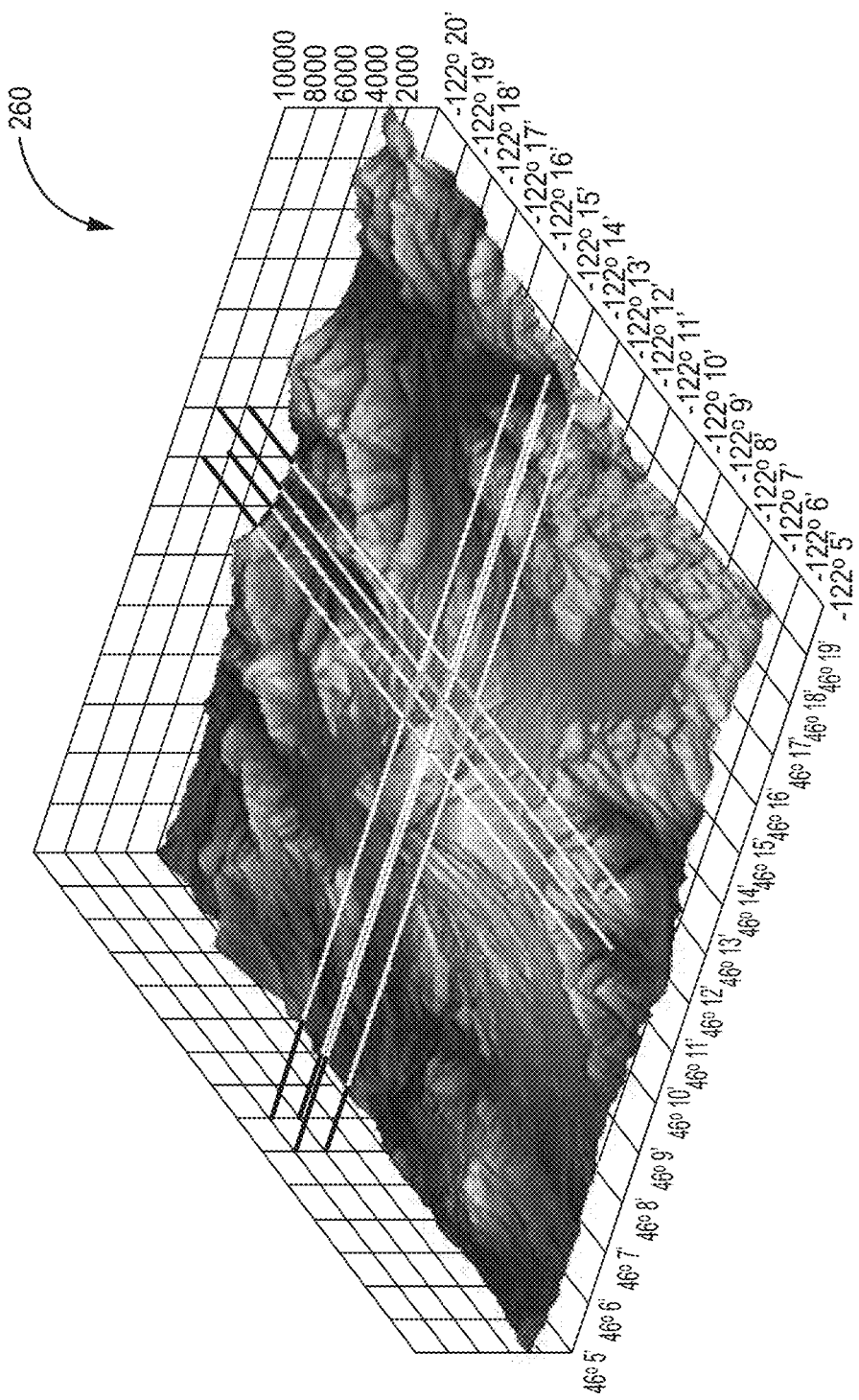
FIG. 5 is a graphical representation of an example volumetric grid used by the communication travel plan generation system of FIG. 2.

The geographical simulation and optimization system 242 of the communication travel plan generation system 200 compartmentalizes the volume above the battle space where mission elements are deployed using a 3-dimensional (3D) volumetric grid 260, as shown in FIG. 5. For any given flight path through this volume the communication travel plan generation system 200 can use the radio behavior functions to evaluate the relative characteristics of the connections between the radios on the airborne platform and all communication subscribers at every compartment within the battle space volume through which the orbit passes. This is simply a matter of iterating over all of the individual compartments and evaluating all of the radio functions for the appropriate air and surface radios. This computation allows the communication travel plan generation system 200 to determine the coverage values associated with any prospective orbit for use in the objective function. The iterative evaluation of a series of functions across the entire 3D volume grid 260 is accomplished in one embodiment with the high-performance processing unit 257 computation. The mapping of this algorithm onto high-performance processing unit 257 hardware may be particularly important where integration with real-time, in-mission systems is desirable for continuous re-planning.

Other definitions of coverage are possible of course, and the mathematics of the optimizations employed by communication travel plan generation system 200 remains the same. For example, in an IP-radio-based data network, coverage might be defined as the total bandwidth available for the course of the mission on each digital link. Given that we can compute coverage for a particular flight path, as described above, the communication travel plan generation system approach for finding good flight paths is to optimize for coverage of all subscriber nodes. For a set of n communication subscriber nodes S1...Sn we can compute the "coverage" function:

Coverage(Si) [range 0.0-1.0] and assign a priority value:
Weight(Si) [range 0.0-1.0]
communication travel plan generation system seeks to maximize the objective function:

$$\Sigma_{i=1}^{n} \text{Coverage}(Si) * \text{Weight}(Si)$$

Using this objective function, communication travel plan generation system 200 can iterate over a series of candidate flight paths to find the one with the greatest value for the objective function. That is, communication travel plan generation system 200 is trying to find the greatest value of all coverages for all communication subscriber nodes, with a weight factor allowing for nodes to be prioritized if desired. So, for example, if a simple circular flight path is used, communication travel plan generation system 200 can search through various combinations of centers and radii trying to find the circle with the highest objective function value. Of course, blindly iterating is a very naïve approach to this kind of optimization problem and better approaches are possible.

Figure 6:
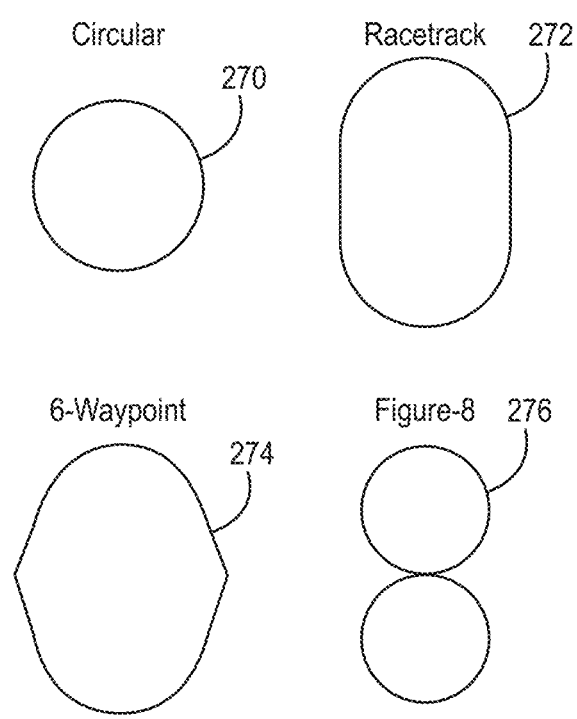
FIG. 6 illustrates example flight plan/orbit templates.

The communication travel plan generation system 200 works by optimizing the parameters of a flight plan/orbit "template" which is selected by the user. Various versions of the template are evaluated for coverage provided to the communication subscribers until a solution is found which the communication travel plan generation system 200 deems acceptable. For example, the simplest template is a circular orbit. The user can select a minimum and a maximum radius for the orbit. The communication travel plan generation system 200 then starts evaluating circular orbits with their centers at various positions and using radii of various sizes until it decides it has found an acceptable solution. In addition to a circular orbit 270 other simple orbit templates that could be used include: a racetrack 272, a 6-waypoint orbit 274 and a figure-eight 276 as illustrated in FIG. 6.

As discussed, the circular orbit 270 is optimized based on varying the latitude and longitude of the center of the circle as well as the radius of the circular orbit 270. A total of three values are needed to describe a candidate orbit. In the case of the racetrack 272 and the figure-eight orbit 276, the latitude, longitude and potentially the altitude of the center of the orbit is varied along with the length and the width of the orbit. In addition, the orbit can be tilted at an arbitrary angle. For these two templates, a total of five values describe the orbit: latitude, longitude, length, width, and tilt. In the final and most complex orbit template, the six-waypoint orbit 274, a total of 14 different values describe the orbit 274: the latitude and longitude of the six waypoints, the radius of the two arcs, and the tilt.

The figure-eight orbit 276 consists of an equal number of left and right turns for the platform, and one of the impacts of the current orbits typically used is that they always turn the platform in a single direction. This preponderance of turns in only one direction is leading to increased maintenance of the platforms deployed, since normal usage scenarios on which maintenance schedules are based assume a more balanced use of left and right turns. Hence, besides communication connections factors the selection of the orbit can be based on many other factors including the orbits impact on the design and maintenance of the vehicle platform.

Figure 7:
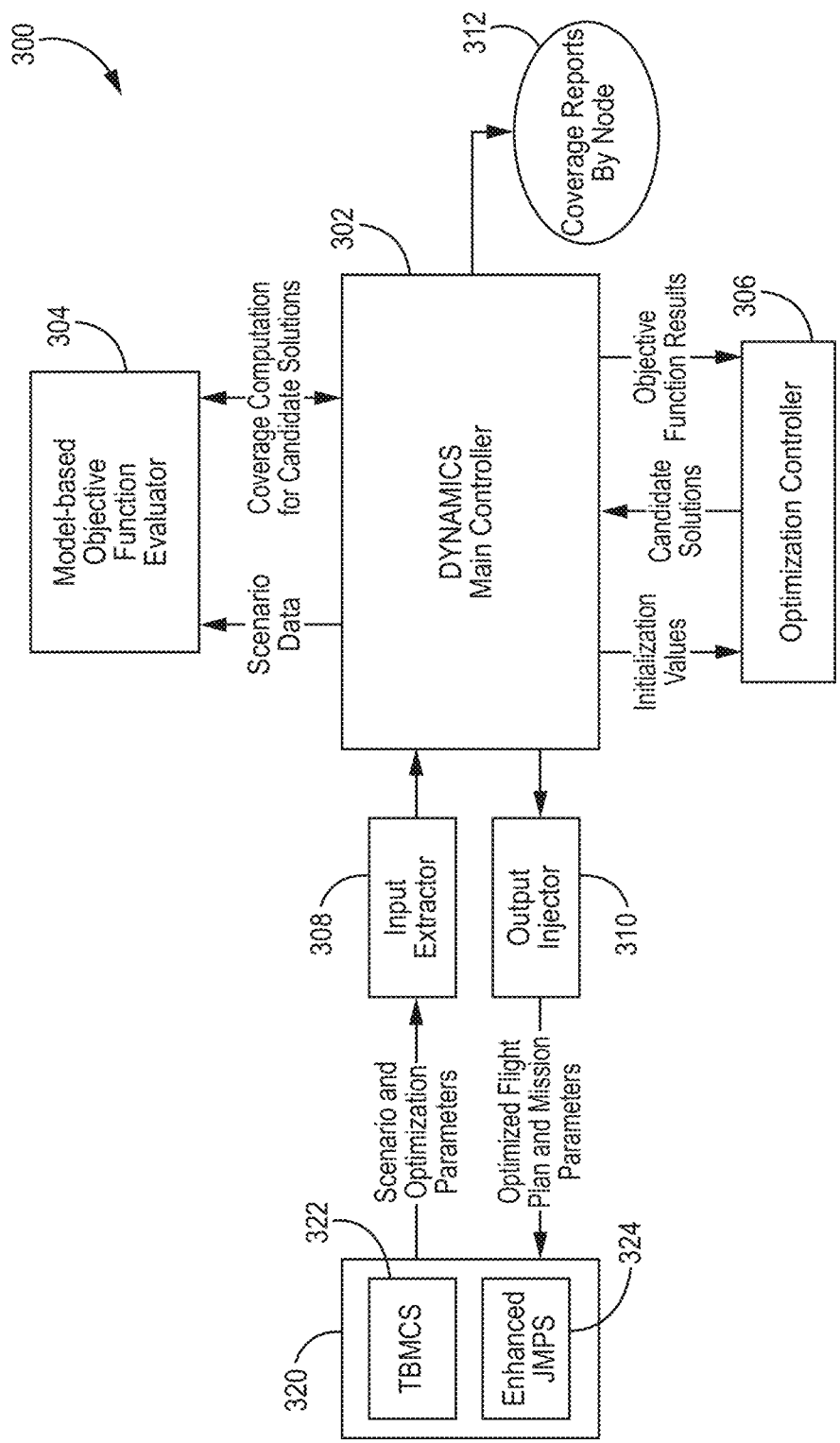
FIG. 7 is a block diagram of an example communication travel plan generation system implemented with an example parent mission planning system.

An example of another embodiment of a communication travel plan generation system 300 that integrates with a "parent" unit-level or force-level mission planning system 320, such as JMPS 322 or Theater Battle Management Care System (TBMCS) 322, as illustrated in FIG. 7. The following summarizes the operation of communication travel plan generation system 300 and its main controller 302 in an embodiment. A mission planner for the mission planning system 320 inputs a set of communication subscriber node locations into that system and designates them as intended radio users of the aerial platform for which a flight path is to be planned. The mission planner employs a menu system of the parent planning system 320 to launch the communication travel plan generation system main controller 302, which is the core of the communication travel plan generation system 300. The main controller 302 uses an input extractor module 308 to obtain the pertinent information about all of the designated communication subscriber nodes from the mission planning system 320 and convert it into the internal formats that communication travel plan generation system 300 employs. This information is primarily the physical location of each communication subscriber node on (or above) the surface of the earth, but may ultimately include other information about the communication subscriber nodes as well, such as what radios and waveforms they are using or priority values.

The main controller 302 then uses this scenario information to program a model of all communication subscriber nodes into a model-based objective function evaluator module 304. Each communication subscriber node is described to the model-based objective function evaluator module 304 in terms of its position and altitude, and terrain maps for the area where the nodes are positioned are loaded into the model-based objective function evaluator module 304. At the same time, the main controller 302 creates an aerial platform with a default orbit in the model-based objective function evaluator module 304.

The main controller 302 includes menus and dialogs (using the conventions of the parent planning system where possible) which allow the user to select the aerial platform's flight level, its airspeed, and to select various options controlling how the orbit to be planned is constructed. The primary option is selecting the basic flight template to be used and selecting the parameter ranges to be used for this planning run. As discussed above, for example, if a circular orbit is chosen the user can set minimum and maximum values for the radius of the orbit. The main controller 302 uses these settings to construct a default orbit in the model-based objective function evaluator module 304 and also to initialize the optimization controller module 306 that is in communication with the main controller 302. Using the simple circular orbit case example, the optimization controller module 306 is configured to vary the four components of a circular orbit: the latitude, longitude an altitude of the center of the orbit and the radius (4-tuple: latitude longitude, altitude and radius).

When the user selects the menu item to begin optimizing a flight plan, the communication travel plan generation system 300 begins mediating between the optimization controller module 306 and the model-based objective function evaluator module 304. The optimization controller module 306 supplies a candidate orbit (a (latitude, longitude, radius) value in this example) and the main controller 302 programs this orbit into the model-based objective function evaluator module 304. It then uses the model-based objective function evaluator module 304 to compute the coverage for each communication subscriber node given that orbit. The main controller 302 then sums up all of the coverage values to compute the value of the objective function for that particular candidate orbit and returns the value of the objective function to the optimization controller module 306. The optimization controller module 306 examines this result and either decides the optimization is complete or supplies a new candidate orbit for evaluation. This process is repeated until the optimization controller module 306 signals completion of the optimization. At completion, the final candidate orbit tested is the optimized orbit.

At the completion of an optimization run, the mission planner can review the final coverage values for each communication subscriber node and examine the details of the final orbit values. In an embodiment, the mission planner may choose to accept the orbit or change parameters and initiate another optimization run as described above, perhaps changing the minimum/maximum radius or choosing another orbit template. The mission planer can also generate coverage reports, in embodiments, for any or all communication subscriber nodes, which describe in detail when and for how long each communication subscriber node should expect connectivity through the aerial platform. When mission planner is satisfied with the optimized orbit created by communication travel plan generation system 300, the mission planner signals an acceptance and the main controller 302 invokes the output injector module 310 which converts the resulting orbit into the format expected by the parent planning system 320 and inserts the result back into that system. The main controller 302 then exits and the communication travel plan generation system 300 run is complete.

The communication travel plan generation system 300 in an embodiment is platform independent when it comes to input and output. This allows communication travel plan generation system to run on different platforms/frameworks such as JMPS, JMPS-E, or any other/future system. It also allows the communication travel plan generation system 300 to run standalone if needed. The input and output of the communication travel plan generation system 300 are handled by two modules: the Input Extractor (IE) module 308 and the Output Injector (OI) module 310 respectively. These modules 308 and 310 provide a common Application Programming Interface (API) at the application level hiding the implementation details of the data exchange protocol of the underlying platform. In a standalone embodiment, these modules 308 and 310 provide a user interface to directly communicate with the mission planner to extract input and generate output. In standalone mode or plugin-mode (such as a JMPS plugin), a set of import and export functions are used to import and export data from standard formats on the targeted platform. On systems like JMPS, the framework also defines a programming API to directly exchange data at runtime. This API is used by the communication travel plan generation system 300 to get direct access to JMPS's data to allow for a more efficient and dynamic data exchange mechanism which in-turns allow better integration of the communication travel plan generation system 300 with existing planning tools.

Figure 8:
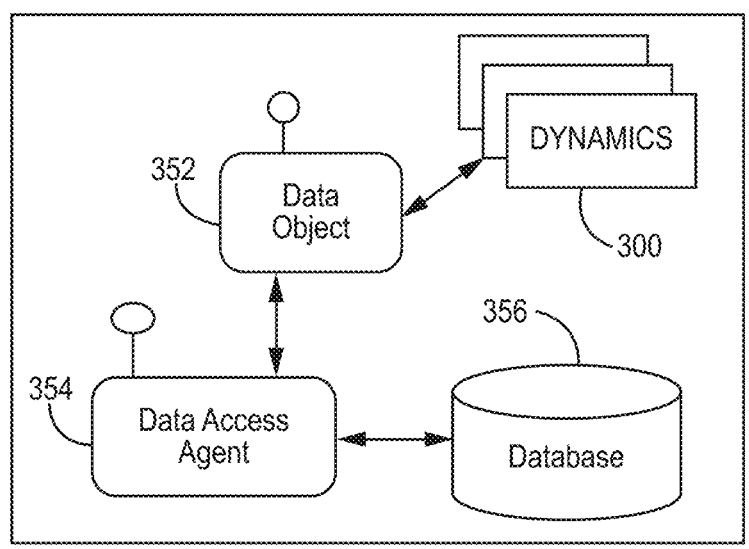
FIG. 8 is a block diagram illustrating an example exchange of data in the system of FIG. 7.

The data model inside JMPS can be accessed as a Common Object Module (COM), in that the applications can programmatically communicate with the data model independent of the display. When running inside JMPS, the communication travel plan generation system 300 utilizes JMPS APIs available through IJmpsApplication interface to access data and state information. When exchanging data 354 with JMPS, the client application (communication travel plan generation system 300) uses JMPS Data Objects (DO) 352 and Data Access Agent (DAA) 354 as shown in FIG. 8 to setup desired attributes such as Read-Only vs Read-Write access, controlled editing (how many clients can access a DO at a time), and many other attributes. For data objects 352, two functions can be implemented, INotificationRegistration and INotify that represent two sides of a protocol (client-server). The INotify interface provides the capability for server components to send notifications to their registered client components. This is used by communication travel plan generation system 300 to collect information about specific DOs 352 (communication subscribers for example) and continuously get updated if the data changes. The INotificationRegistration interface provides the capability for client components to register/unregister for notifications with server components. This is used to inject Route Data Objects back into JMPS once communication travel plan generation system finds a route that fits the desired criteria.

The communication travel plan generation system 300 uses a modeling module for evaluating the coverage values for a particular candidate orbit. An example of a suitable tool for performing this function is the COTS software package Systems Tool Kit (STK) from Analytical Graphics, Inc. The modeling module provides 3D graphical modeling capabilities, along with add-on modules for functions such as terrain and radio models. It provides the modeling engine to determine whether any 2 radios (communication subscriber nodes) are able to be in contact at any given time and compute the coverage function for each pair of radios for a given orbit. The modeling module is capable of taking into account (if desired) radio, antenna, attitude, terrain, and even weather parameters. It makes all of these functions available via a series of APIs used by communication travel plan generation system 300.

Figure 9:
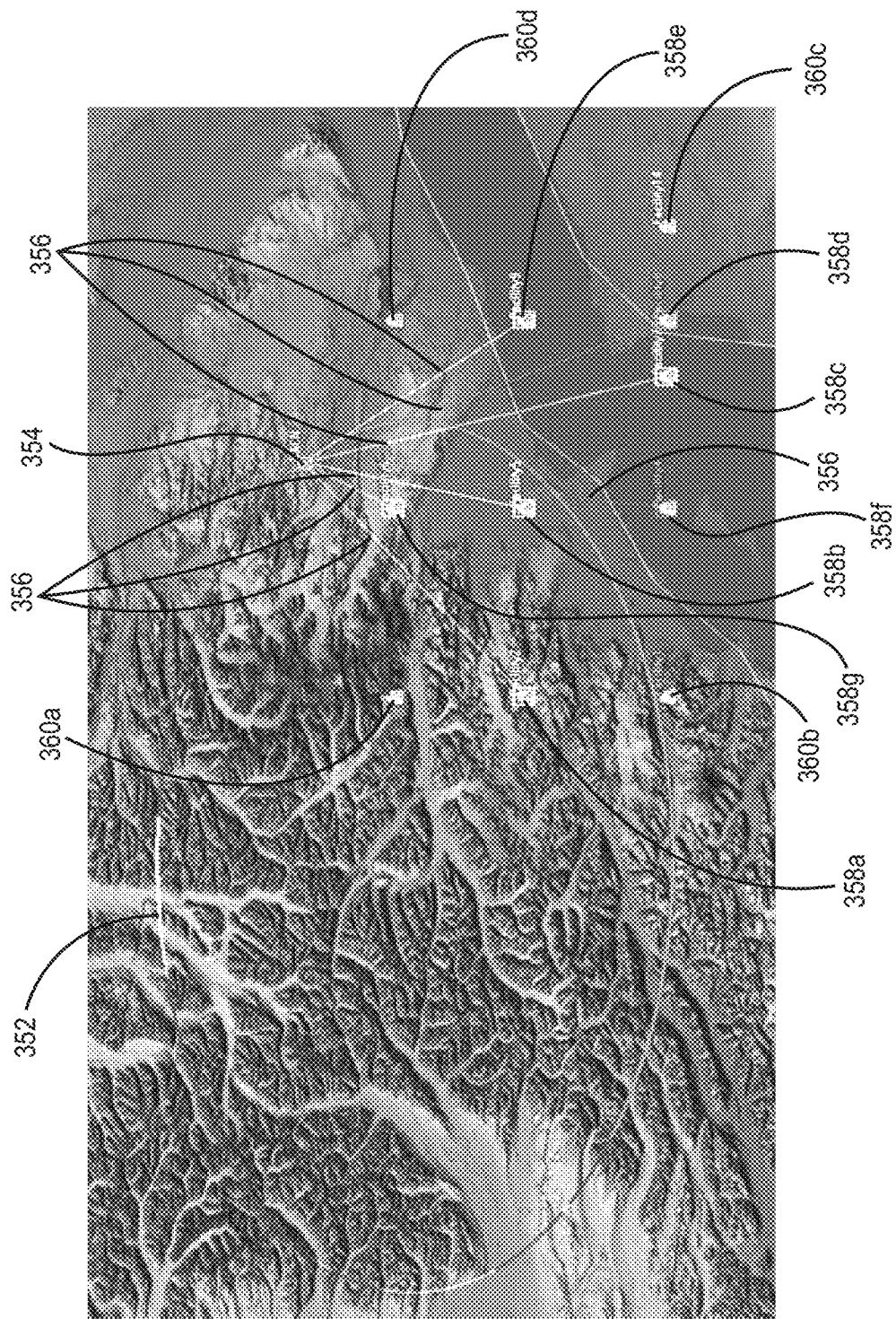
FIG. 9 is a screen shot example of an example modeled communication system coverage implemented by the communication travel plan generation system of FIG. 2.

Referring to FIG. 9, a screenshot example of a STK-based modeling module 352 in operation is provided. The connecting lines 356 from the orbiting aircraft 354 to individual communication subscriber nodes 358a-358g indicate that communication coverage is available between communication subscriber nodes 358a-358g and the orbiting aircraft 354 at this point in the simulation. The FIG. 9 also illustrates that communication coverage is not available for communication subscriber nodes 360a-360d at this point in the simulation.

As discussed above, communication travel plan generation system 300 uses an optimization controller module 306 to iterate over potential candidate orbits in search of the best orbit. This is inherently a non-deterministic search, and the problem of finding a truly optimal path for the general case is computationally infeasible. The key is to have an optimization approach to this intractable problem which operates efficiently and generates reasonable results as quickly as possible and for minimal computational cost.

An example of an optimization module which is a good fit for the type of optimizations which the communication travel plan generation system performs is called HOPSPACK (Hybrid Optimization Parallel Search Package) developed at Sandia Labs. HOPSPACK is an open-source C++framework for finding solutions to derivative-free optimization problems. It is particularly well suited to problems where the computation of the objective function (the function to be optimized) is complex and costly. This is exactly the scenario faced in communication travel plan generation system 300. HOPSPACK also supports a range of parallelization options. Rather than performing an exhaustive search of all possible orbits, HOPSPACK uses a "generating set search" or "adaptive surrogate" approach. The optimization process begins by statistically sampling a variety of possible solutions, then using the best of these as starting points in a reduced search space. This approach greatly reduces the computational power that is required for an exhaustive search, while still yielding good results in most cases.

Figure 10:
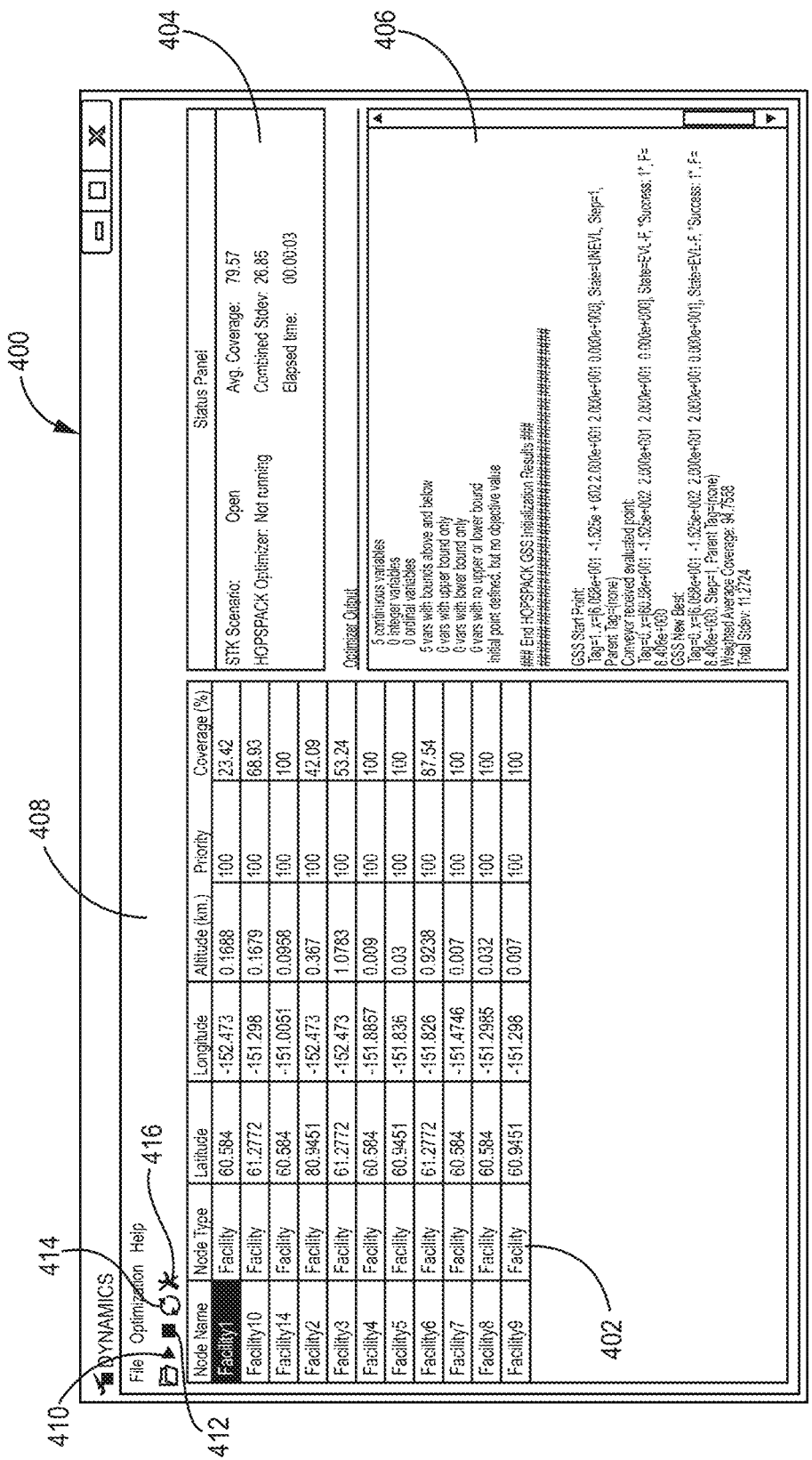
FIG. 10 is a screen shot of an example main window of the communication travel plan generation system of FIG. 2.

An example of a main communication travel plan generation system window 400 is shown in FIG. 10. Each time the communication travel plan generation system application is started it also starts an instance of the modeling module, and the mission planner employs the file, open function of communication travel plan generation system to select a scenario, which is loaded into the modeling module. The tabular display 402 on the left shows the communication subscriber nodes in the scenario to be optimized along with their position (latitude, longitude and altitude) and the priority value (0-100) assigned to a particular node. The final column on the tabular display 402 shows the coverage/duty-cycle for the particular node for the currently defined orbit, which is visible in the modeling module. A status panel 404 at the upper right of the main communication travel plan generation system window 400 illustrates the status of an optimization run in process, or the final status of the last optimization run completed. When an optimization run is in progress, an optimizer output window 406 at the lower right shows the progress of the optimization. When an optimization run completes the table on the left is automatically updated to reflect the coverage(s) provided by the newly optimized. Vcr-style buttons 410 and 412 start and stop an optimization run, while the circular arrows button 414 manually read coverage values from the modeling module in the event that a new orbit is manually selected. Button 414 can also be used to manually update the node/coverage table during the course of an optimization run if desired. The rightmost button 416 on the toolbar 408 opens up the dialog for the optimization configuration manager. All of these toolbar functions are available through the standard pull-down menu system as well in embodiments.

Figure 11:
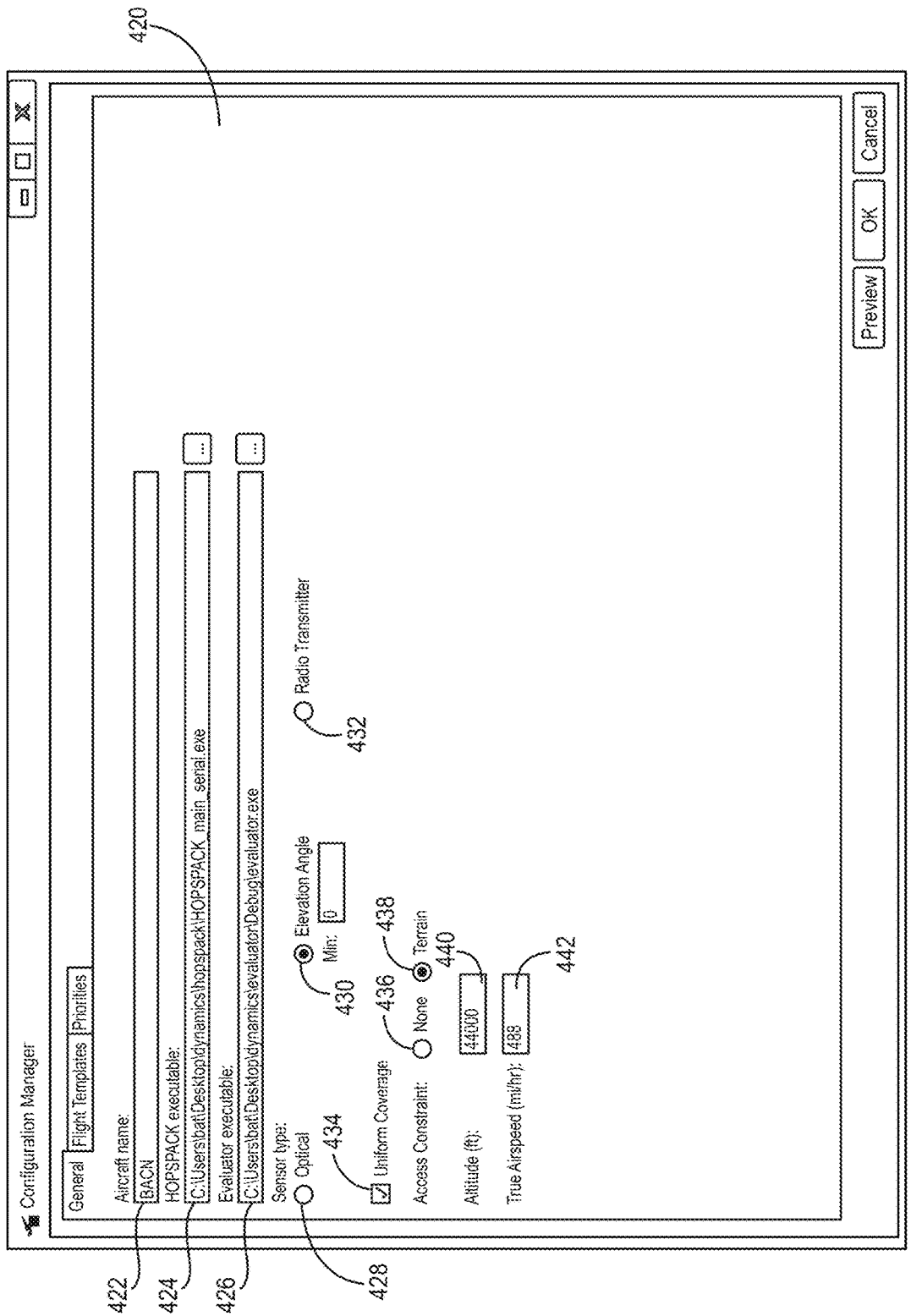
FIG. 11 is a screen shot of an example general options window of the communication travel plan generation system of FIG. 2.

An example of a general options tab of an optimization configuration manager is shown in FIG. 11. The text boxes 422, 424 and 426 provide the name to be displayed for the aerial relay platform in the modeling module as well as the paths to several executable files (HOPSPACK and the communication travel plan generation system evaluator program) which are needed by communication travel plan generation system 300 at runtime. These values are basically set once at installation and are rarely, if ever, changed. The prototype supports three different coverage models, optical 428, elevation angle 430 and radio transmitter 432, with any one selection being valid at one time. The optical model 428 is a pure line-of-sight function between each communication subscriber node and a simulated optical sensor mounted on the belly of the platform. This sensor tilts when the plane banks. The elevation angle model 430 computes the intersection of a cone extending downward from the plane and upwards from each communication subscriber node for the given angle. When the cones overlap coverage occurs. The cone associated with the plane does not tilt when the plane banks.

A uniform coverage checkbox 434 enables a feature which adds a standard deviation component to the objective function discussed above. Because communication travel plan generation system 300 is trying to find the maximum value of the objective function it is possible that one of more communication subscriber nodes may be left out completely, that is, receiving zero coverage even though the overall objective function is maximized. When the uniform coverage feature is enabled communication travel plan generation system 300 tries to maximize the objective function while simultaneously minimizing the weighted sum of all the standard deviations in coverage. This effectively smoothes coverage over all the communication subscriber nodes to the extent possible, ensuring that no communication subscriber nodes are left out if at all possible.

Access constraint radio buttons 436 and 438 enable the use of actual terrain data within the modeling module. When terrain mode 438 is enabled the actual terrain between each communication subscriber node and the platform is used to compute coverage. The deeper the communication subscriber node is in a valley or the closer to a mountain the more likely that the platform access is periodically blocked by the intervening terrain. When this mode is enabled the elevation angle value is typically set to 0. The final two values set the altitude 440 and airspeed 442 of the platform.

Figure 12:
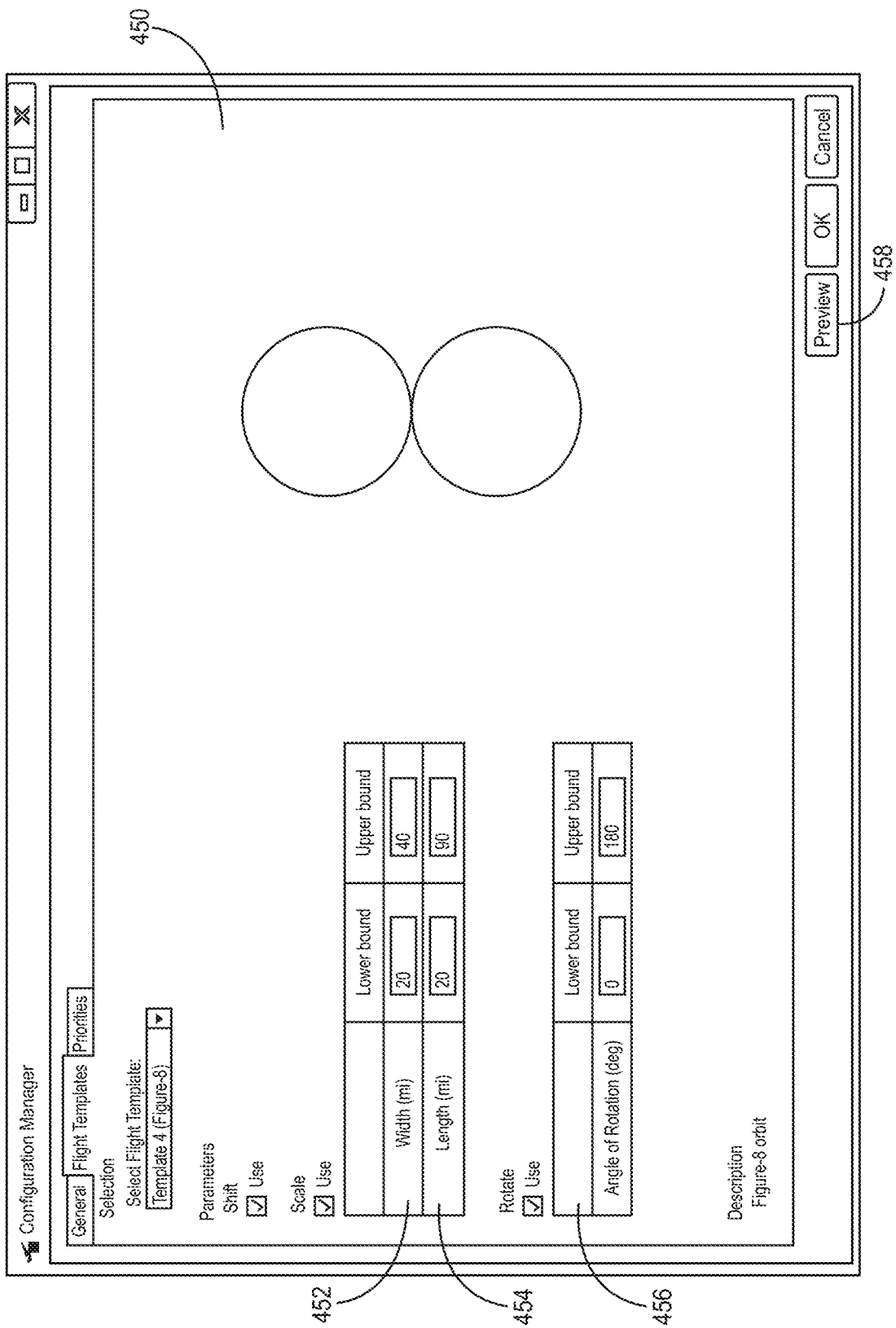
FIG. 12 is a screen shot of an example optimization configuration manager option window of the communication travel plan generation system of FIG. 2.
Figure 13:
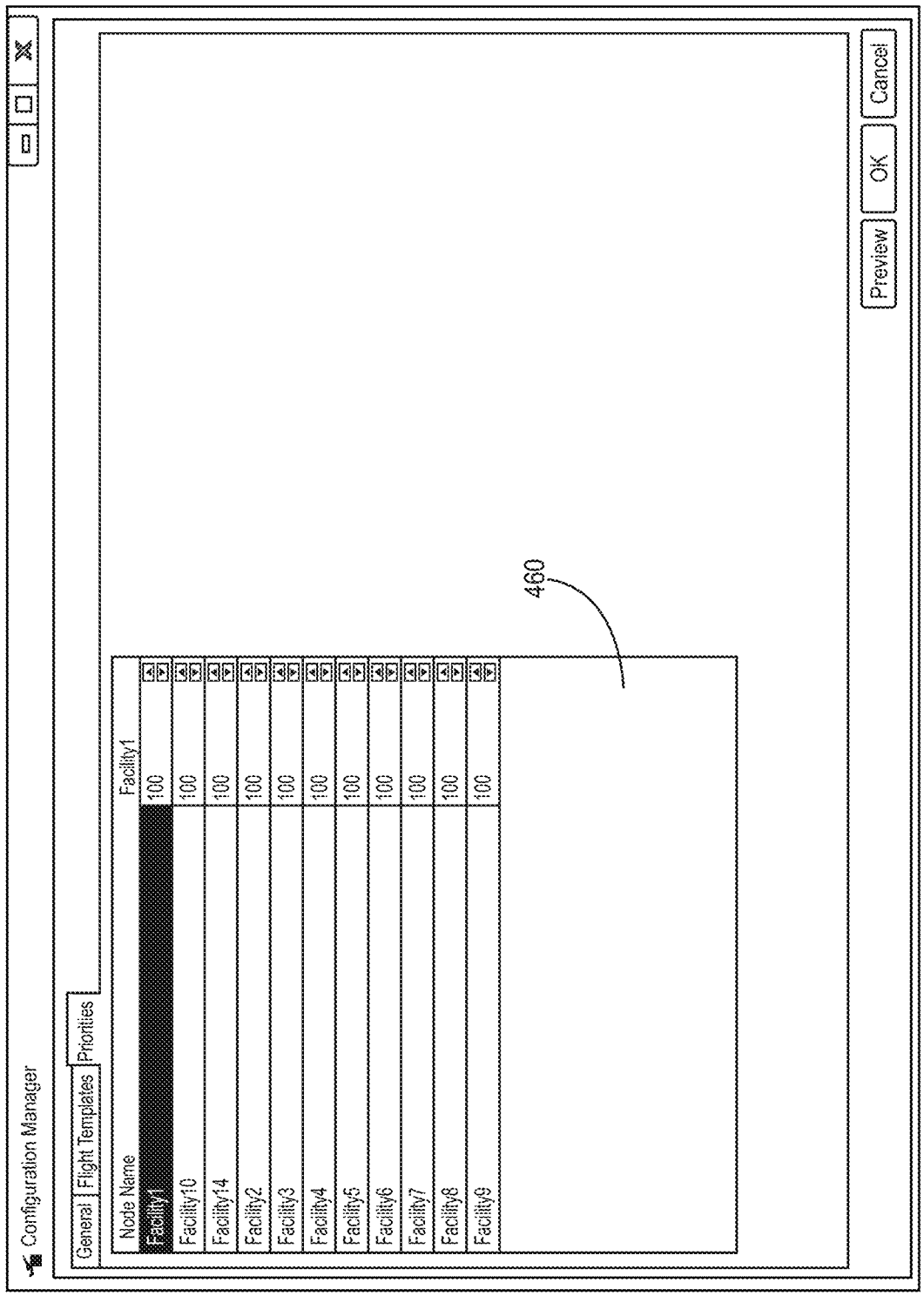
FIG. 13 is a screen shot of an example priority window of the communication travel plan generation system of FIG. 2.

An example of the optimization configuration manager option screen 450 for one of the communication travel plan generation system orbit templates is shown in FIG. 12. FIG. 12 illustrates a configuration dialog for a figure-eight orbital template example. As described above in the discussion of orbital templates, the mission planner is able to select the range of orbit widths 452 and lengths 454 to be used as well as a rotation angle 456 for the entire orbit if desired. A similar configuration dialog exists for each of the other orbit templates, allowing the user to select a range of values for the orbit parameters. A preview button 458 inserts a sample of the parameterized orbit into the modeling module. This is typically just an instance of the given orbit type centered on the communication subscriber nodes and 50% of the size of the bounding box which surrounds all the communication subscriber nodes in the scenario. This can be thought of as a "naïve" orbit which a planner might set and is useful as the starting point to show how communication travel plan generation system 300 can improve and optimize this orbit to get better coverage. The dialog used to select priority values for individual communication subscriber nodes is shown in the priority screen 460 in FIG. 13. Each communication subscriber node can be assigned a priority value between 0 and 100. This priority value is used to weight the communication subscriber nodes contribution to the objective function as described above.

Figure 14:
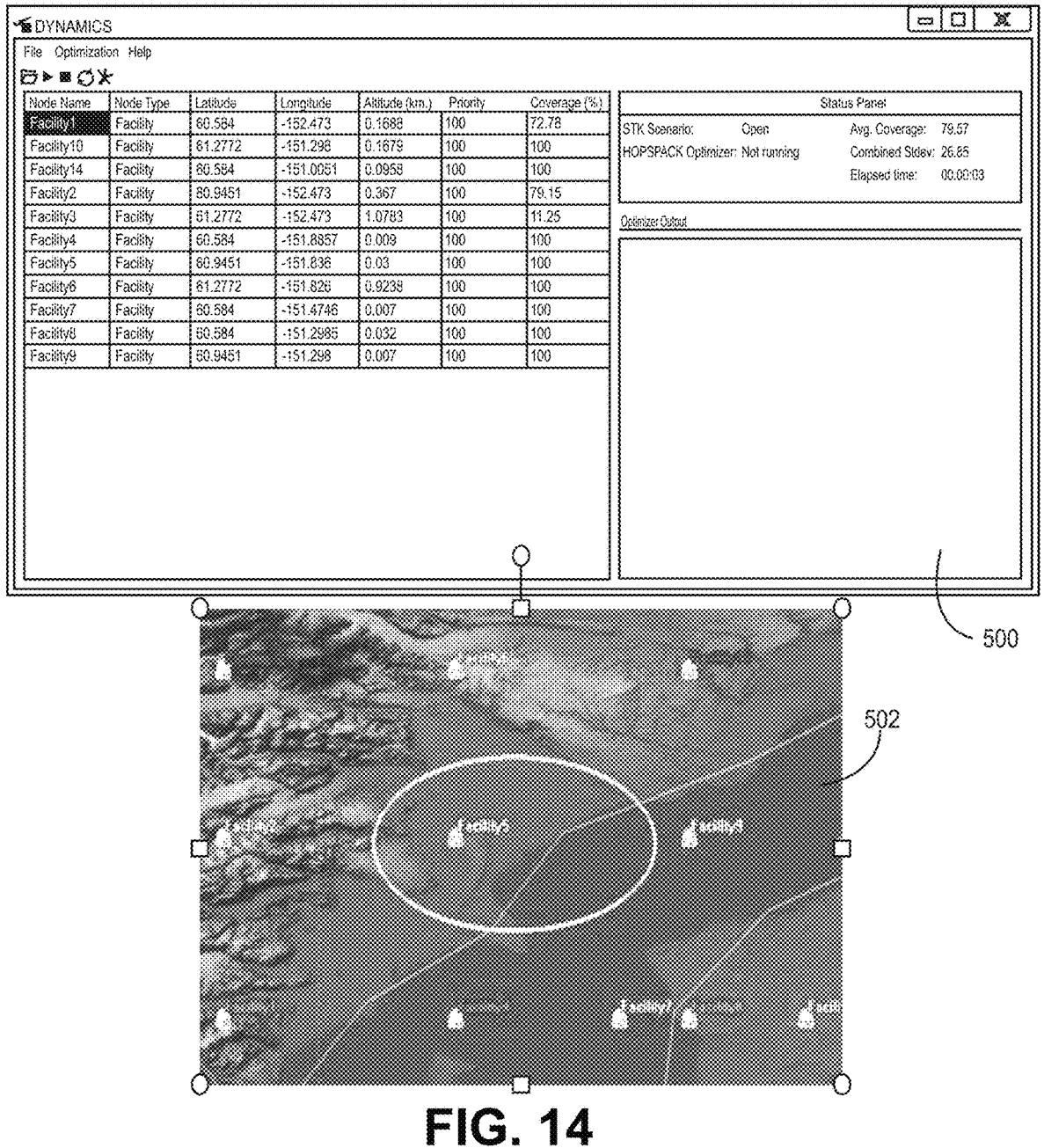
FIG. 14 is an illustration of an example determined flight path before optimization in the communication travel plan generation system of FIG. 2.
Figure 15:
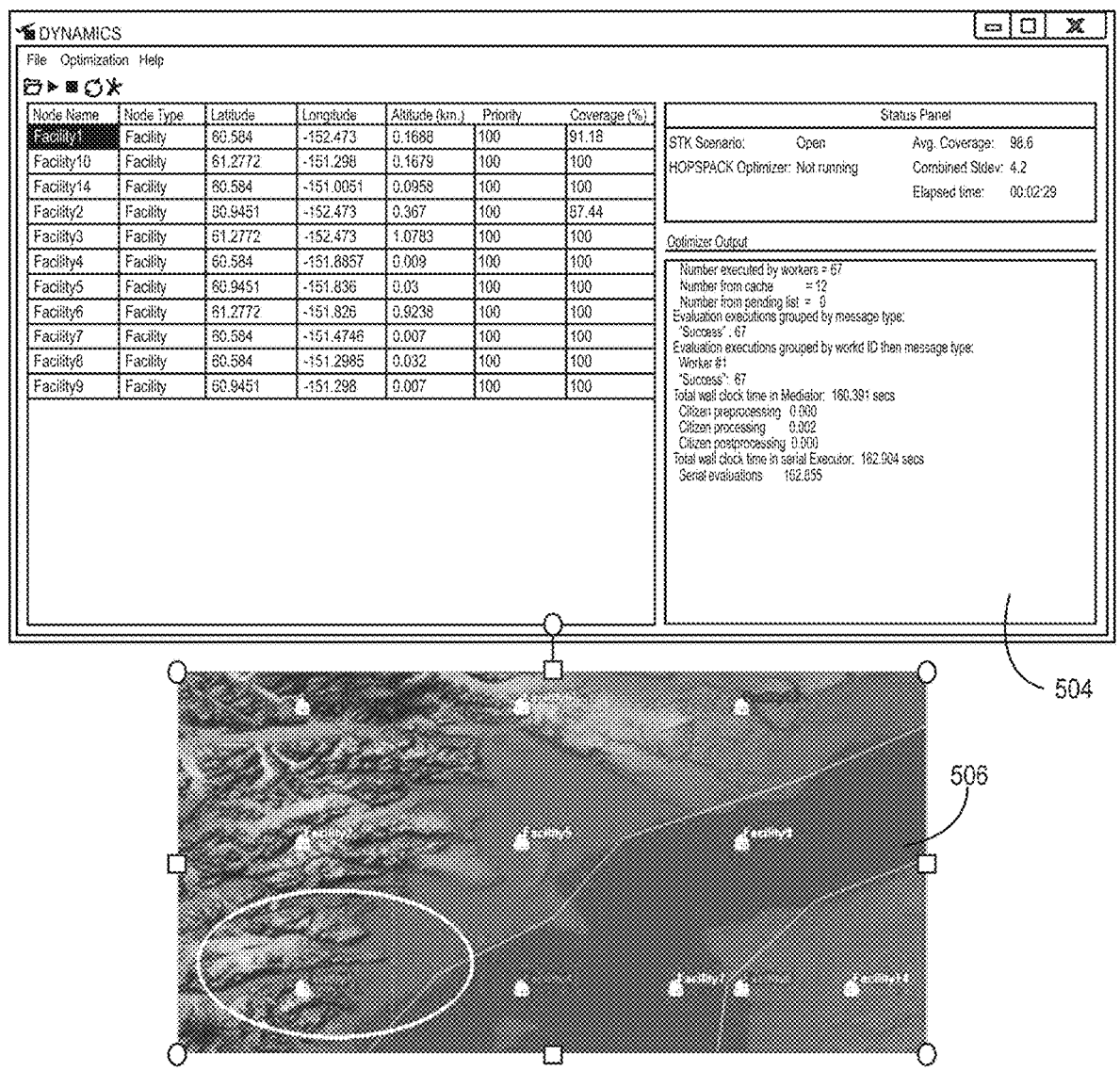
FIG. 15 is an illustration of the determined flight path of FIG. 14 after optimization.

As described above, the "preview" function in an embodiment is used to set a "naïve" orbit and computed the coverage values for that orbit. Then the communication travel plan generation system optimizer is run and measured improvements made over the initial orbit are shown. The optimizer consistently improves the orbit/flight plan by providing better overall coverage values and/or providing smoother coverage for more subscriber nodes in the scenario. In cases where overall coverage went down the standard deviation of all coverages was also reduced, thus trading overall coverage for fairer coverage spread across all nodes. The sampling of results discussed here are for simulation runs using a line of sight coverage model based on the actual terrain on the ground, with the standard deviation "smoothing" option enabled. For example, FIG. 14 ("Before") and FIG. 15 ("After") show the results of one simple scenario. In this example, eleven communication subscriber nodes are positioned on terrain east of Anchorage, Ak. For a simple "preview" circular orbit most of the nodes achieve excellent coverage, as many nodes, particularly those to the east/right, are on flat plains or even on the water. Facilities 1, 2, and 3, however are in mountains and river valleys to the west/left of the terrain illustration 502. As shown in the communication travel plan generation system coverage before display 500 of FIG. 14, they have less than perfect coverage, with Facility 3 in particular getting only about 12% coverage before optimization. The optimization results, as shown in the after display 504 of FIG. 15, shift the circular orbit to the west and shrink it slightly as illustrated in the terrain illustration 506 of FIG. 16. The optimization allows for much better coverage of those 3 "problem" nodes with coverage for all three of them improving and Facility 3 now getting 100% coverage. Overall coverage improves from 87% to 98% while the combined standard deviation drops from 26 to 4. This simple optimization run completed in about 2 and ½ minutes on a Windows 7 communication travel plan generation system development and demonstration system.

Figure 16:
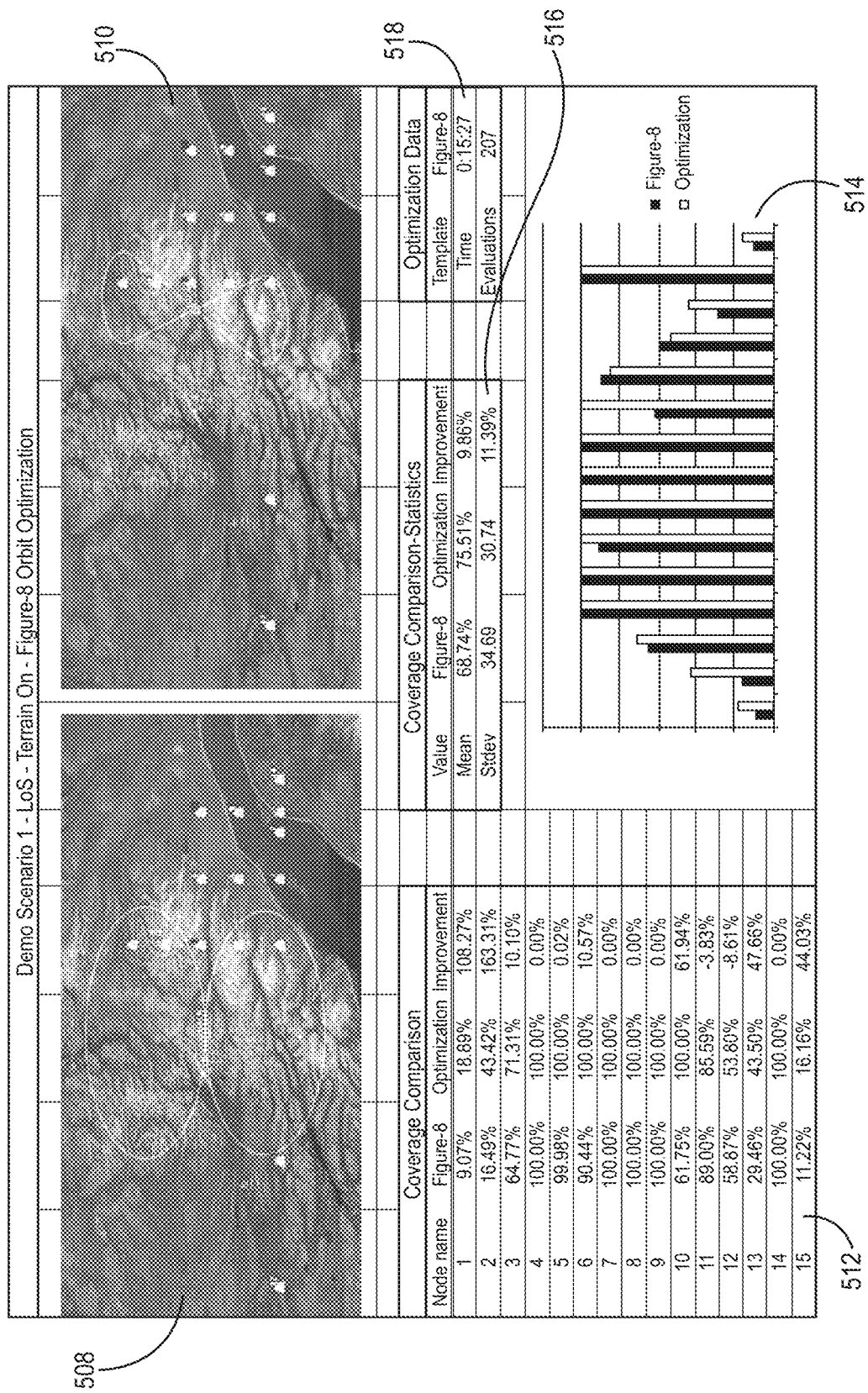
FIG. 16 is another illustration of an example determined flight path before and after optimization.

Another example implementing a figure-eight optimization is illustrated in FIG. 16. The use of the figure-eight path before optimization is illustrated in the before display 508. The figure-eight path after optimization is illustrated in the after display 510. Coverage comparison is illustrated in display 512. A graph illustrating the FIG. 8 before and after optimization is illustrated in graph display 514. Moreover, coverage comparison statistics is shown in display 516 and optimization data is shown in display 518 for this example. In an embodiment, if a simple geometry of a candidate orbit calls for a sharp turn at that point, but the mission modeler determined that this turn is outside the physical capabilities of the aerial platform being modeled (a military transport from STK's "stock" library of airplanes or other database). The communication travel plan generation system automatically converted the sharp right turn into a sweeping turn, and the coverage value computation is based on this actual flight path.

In an example, the communication travel plan generation systems described herein are generally an inverse mission planning system. Embodiments support both fully automatic and human assisted mission planning. The communication travel plan generation systems compute travel waypoints automatically based on mission-specific information. The inverse mission flight planning system computes flight plans and waypoints automatically based on mission-specific information. This inverse mission flight planning system has many applications. One application is for military situations where an aerial communication platform mission is needed to provide communication links to radio subscribers (generally described as subscriber communication nodes) on land, in the air, and at sea. The mission-specific information includes the types of subscriber communication nodes to be used, the capabilities of the aerial platform itself, and a host of other potential data such as terrain, weather and the relative priority of the various subscriber nodes.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:
1. A method of generating a flight path for an aircraft comprising:
   creating a model of geographic space and time that includes a plurality of mobile communication nodes, wherein the model accounts for movement of each of the plurality of mobile communication nodes, wherein the model provides an indication of wireless connectivity between a radio on each of the plurality of communication nodes and a radio of the aircraft at their respective locations;
   running a plurality of flight paths through the model in order to identify a selected flight path that provides a desired level of connectivity between the aircraft and the plurality of communication nodes;
   receiving outputs from sensors of the aircraft as the aircraft travels along the selected flight path;
   determining locations of the plurality of mobile communication nodes based on the outputs of the sensors;
   comparing the determined locations of the plurality of mobile communication nodes to locations used during the step of creating the model of geographic space and time; and
   if any of the determined locations is outside of a threshold range of the locations used during the step of creating the model of geographic space and time, dynamically updating the selected flight path of the aircraft by:
      creating an updated model of geographic space and time based on the outputs from the sensors; and
      running a second plurality of flight paths through the updated model to identify an updated flight path that provides the desired level of connectivity between the aircraft and the plurality of communication nodes.

2. The method of claim 1, wherein running the plurality of flight paths through the model includes:
   obtaining an initial flight path;
   varying one or more aspects of the initial flight path at differing amounts to generate a series of flight paths from the initial flight path; and
   running the series of flight paths through the model.

3. The method of claim 2, wherein obtaining the initial flight path includes receiving a manual selection of the initial flight path from a user.

4. The method of claim 3, further comprising receiving a range of variation of the one or more aspects used to generate the series of flight paths as a manual input from a user.

5. The method of claim 1, wherein the model of geographic space and time is a three-dimensional model.

6. The method of claim 1, wherein creating the model takes into account different radio characteristics for different radio types at different communication nodes.

7. The method of claim 1, further comprising:
receiving a plan that includes information on the plurality of communication nodes from a mission planning system;
extracting location information for the plurality of communication nodes from the plan; and
using the extracted location information as the location of the plurality of communication nodes when modeling the geographic space and time.

8. The method of claim 7, wherein the plan is in a native format of one of a joint mission planning system (JMPS) or a theater battle management care system (TBMCS).

9. The method of claim 7, further comprising:
extracting information including one or more of mission elements, communications/connectivity requirements, aircraft capabilities and constraints from the plan and using the extracted information during the step of creating the model of geographic space and time.

10. The method of claim 1, further comprising:
receiving outputs from sensors of the aircraft as the aircraft, travels along the selected flight path;
comparing the outputs of the sensors to values used during the step of creating the model of geographic space and time;
if any of the outputs from the sensors is outside of a threshold range of the values used during the step of creating the model of geographic space and time,
dynamically updating the selected flight path of the aircraft by creating a second updated model of geographic space and time based on the outputs from the sensors; and
running a third plurality of flight paths through the second updated model to identify a second updated flight path that provides the desired level of connectivity between the aircraft and the plurality of communication nodes.

11. The method of claim 10, wherein the outputs from the sensors include one or more of information on terrain, weather, antenna orientation, a position of one or more of the plurality of communication nodes, or a position of an enemy element.

12. A non-transitory processor readable medium comprising:
instructions stored thereon, wherein the instructions, when executed by one or more processing devices, cause the one or more processing devices to:
create a model of geographic space and time including a plurality of mobile communication nodes, wherein the model accounts for movement of each of the plurality of mobile communication nodes, wherein the model provides an indication of wireless connectivity between a radio on each of the plurality of communication nodes and a radio of the aircraft at their respective locations;
run a plurality of flight paths through the model in order to identify a selected flight path that provides a desired level of connectivity between the aircraft and the plurality of communication nodes;
receive outputs from sensors of the aircraft as the aircraft travels along the selected flight path;
determine locations of the plurality of mobile communication nodes based on the outputs of the sensors;
compare the determined locations of the plurality of mobile communication nodes to locations used during the step of create the model of geographic space and time; and
if any of the determined locations is outside of a threshold range of the locations used during the step of create the model of geographic space and time, dynamically update the selected flight path of the aircraft by:
creating an updated model of geographic space and time based on the outputs from the sensors; and
run a second plurality of flight paths through the updated model to identify an updated flight path that provides the desired level of connectivity between the aircraft and the plurality of communication nodes.

13. The non-transitory processor readable medium of claim 12, wherein the step of run the plurality of flight paths through the model includes:
obtain an initial flight path;
vary one or more aspects of the initial flight path at differing amounts to generate a series of flight paths from the initial flight path; and
run the series of flight paths through the model.

14. The non-transitory processor readable medium of claim 13, wherein obtain the initial flight path includes receiving a manual selection of the initial flight path from a user.

15. The non-transitory processor readable medium of claim 14, wherein the instructions, when executed by the one or more processing devices, further cause the one or more processing devices to:
receive a range of variation of the one or more aspects used to generate the series of flight paths as a manual input from a user.

16. The non-transitory processor readable medium of claim 12, wherein the model of geographic space and time is a three-dimensional model.

17. The non-transitory processor readable medium of claim 12, wherein creating the model takes into account different radio characteristics for different radio types at different communication nodes.

18. The non-transitory processor readable of claim 12, wherein the instructions, when executed by the one or more processing devices, further cause the one or more processing devices to:
receive a plan that includes information on the plurality of communication nodes from a mission planning system;
extract location information for the plurality of communication nodes from the plan; and
use the extracted location information as the location of the plurality of communication nodes when modeling the geographic space and time.

19. The non-transitory processor readable medium of claim 18, wherein the plan is in a native format of one of a joint mission planning system (JMPS) or a theater battle management care system (TBMCS).

20. The non-transitory processor readable medium of claim 18, wherein the instructions, when executed by the one or more processing devices, further cause the one or more processing devices to:
extract information including one or more of mission elements, communications/connectivity requirements, aircraft capabilities and constraints from the plan and using the extracted information when modeling geographic space and time.

21. The non-transitory processor readable medium of claim 12, wherein the instructions, when executed by the one or more processing devices, further cause the one or more processing devices to:
receive outputs from sensors of the aircraft as the aircraft travels along the selected flight path;
compare the outputs of the sensors to values used during the step of create the model of geographic space and time;
if any of the outputs from the sensors is outside of a threshold range of the values used during the step of create the model of geographic space and time,
dynamically update the selected flight path of the aircraft by creating a second updated model of geographic space and time based on the outputs from the sensors; and
run a third plurality of flight paths through the second updated model to identify a second updated flight path that provides the desired level of connectivity between the aircraft and the plurality of communication nodes.

22. The non-transitory processor readable medium of claim 21, wherein the outputs from the sensors include one or more of information on terrain, weather, antenna orientation, a position of one or more of the plurality of communication nodes, or a position of an enemy element.

23. An aircraft comprising:
a means of propulsion;
one or more processing devices configured to control the means of propulsion;
a data storage medium coupled to the one or more processing devices, the data storage medium having instructions stored thereon, wherein the instructions, when executed by the one or more processing devices, cause the one or more processing devices to:
control the means of propulsion to propel the aircraft along a flight path generated based on a model of geographic space and time;
obtain information regarding the environment around the aircraft via sensors on the aircraft as the aircraft travels along the flight path;
compare the information from the sensors to values used for the model of geographic space and time;
if any of the information from the sensors is outside of a threshold range of the values used for the model the geographic space and time,
dynamically update the flight path of the aircraft by creating an updated model of geographic space and time based on the outputs from the sensors; and
run a plurality of flight paths through the updated model to identify an updated flight path that provides a desired level of connectivity between the aircraft and the plurality of communication nodes.

24. The aircraft of claim 23, wherein the information from the sensors includes one or more of information on terrain, weather, antenna orientation, a position of one or more of the plurality of communication nodes, or a position of an enemy element.

* * * * *